US012631982B2

(12) United States Patent
Fukudome et al.

(10) Patent No.: US 12,631,982 B2
(45) Date of Patent: May 19, 2026

(54) TONER

(71) Applicant: CANON KABUSHIKI KAISHA, Tokyo (JP)

(72) Inventors: Kosuke Fukudome, Tokyo (JP); Shohei Tsuda, Shizuoka (JP); Kenta Kamikura, Kanagawa (JP); Satoshi Arimura, Shizuoka (JP); Toru Ishii, Shizuoka (JP); Yuta Komiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 507 days.

(21) Appl. No.: 18/173,247

(22) Filed: Feb. 23, 2023

(65) Prior Publication Data

US 2023/0273538 A1 Aug. 31, 2023

(30) Foreign Application Priority Data

Feb. 28, 2022 (JP) ................................ 2022-029588

(51) Int. Cl.
*G03G 9/097* (2006.01)

(52) U.S. Cl.
CPC ..... *G03G 9/09708* (2013.01); *G03G 9/09791* (2013.01)

(58) Field of Classification Search
CPC ....................... G03G 9/09708; G03G 9/09791
See application file for complete search history.

(56) References Cited

U.S. PATENT DOCUMENTS

| | | | |
|---|---|---|---|
| 7,123,862 | B2 | 10/2006 | Hasegawa |
| 7,141,342 | B2 | 11/2006 | Toyoda |
| 7,264,910 | B2 | 9/2007 | Toyoda |
| 7,537,875 | B2 | 5/2009 | Mikuriya et al. |
| 7,582,401 | B2 | 9/2009 | Ogawa |

(Continued)

FOREIGN PATENT DOCUMENTS

| | | |
|---|---|---|
| CN | 100507727 C | 7/2009 |
| EP | 3 709 087 A1 | 9/2020 |

(Continued)

OTHER PUBLICATIONS

U.S. Appl. No. 18/046,585, Yuta Komiya, filed Oct. 14, 2022.

(Continued)

*Primary Examiner* — Peter L Vajda
*Assistant Examiner* — Jenna Kuipers
(74) *Attorney, Agent, or Firm* — VENABLE LLP

(57) ABSTRACT

A toner comprising a toner particle comprising a binder resin, a fatty acid metal salt particle on a surface of the toner particle, and a hydrotalcite particle on a surface of the toner particle, wherein the hydrotalcite particle comprises fluorine, the fluorine is present inside the hydrotalcite particle in line analysis of STEM-EDS mapping analysis of the toner, and when an area ratio of the fatty acid metal salt particle to the toner particle in an EDS measurement field, which is measured through the STEM-EDS mapping analysis of the toner, is defined as S1(%) and an area ratio of the hydrotalcite particle to the toner particle in the EDS measurement field, which is measured through the STEM-EDS mapping analysis of the toner, is defined as H1(%), S1/H1 is 0.25 to 9.00.

6 Claims, 1 Drawing Sheet

(56) References Cited

U.S. PATENT DOCUMENTS

| | | | |
|---|---|---|---|
| 7,611,812 | B2 | 11/2009 | Michel et al. |
| 7,678,523 | B2 | 3/2010 | Hiroko |
| 7,678,524 | B2 | 3/2010 | Hasegawa |
| 7,833,685 | B2 | 11/2010 | Tanaka |
| 7,833,687 | B2 | 11/2010 | Kato |
| 7,923,190 | B2 | 4/2011 | Magome |
| 7,935,467 | B2 | 5/2011 | Dojo |
| 8,211,606 | B2 | 7/2012 | Murai |
| 8,227,162 | B2 | 7/2012 | Sano |
| 8,377,616 | B2 | 2/2013 | Tani |
| 8,426,091 | B2 | 4/2013 | Magome |
| 8,426,094 | B2 | 4/2013 | Magome |
| 8,518,620 | B2 | 8/2013 | Dojo |
| 8,614,044 | B2 | 12/2013 | Matsui |
| 8,628,899 | B2 | 1/2014 | Kawamura |
| 8,652,722 | B2 | 2/2014 | Yoshida et al. |
| 8,697,327 | B2 | 4/2014 | Shibata |
| 8,778,585 | B2 | 7/2014 | Matsui |
| 8,815,484 | B2 | 8/2014 | Tanaka |
| 8,828,639 | B2 | 9/2014 | Kamikura |
| 8,841,054 | B2 | 9/2014 | Dojo |
| 8,916,319 | B2 | 12/2014 | Ikeda |
| 8,940,467 | B2 | 1/2015 | Hashimoto |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,146,485 | B2 | 9/2015 | Tani |
| 9,152,065 | B2 | 10/2015 | Sano |
| 9,158,216 | B2 | 10/2015 | Shimano |
| 9,229,345 | B2 | 1/2016 | Ikeda |
| 9,235,151 | B2 | 1/2016 | Tanaka |
| 9,256,148 | B2 | 2/2016 | Fujikawa |
| 9,261,806 | B2 | 2/2016 | Moribe |
| 9,285,697 | B2 | 3/2016 | Fukudome |
| 9,377,705 | B2 | 6/2016 | Shimano |
| 9,377,708 | B2 | 6/2016 | Magome |
| 9,383,668 | B2 | 7/2016 | Noji |
| 9,423,714 | B2 | 8/2016 | Kenmoku |
| 9,470,993 | B2 | 10/2016 | Nishikawa |
| 9,500,972 | B2 | 11/2016 | Tanaka |
| 9,551,947 | B2 | 1/2017 | Hiroko |
| 9,556,290 | B2 | 1/2017 | Nishiura |
| 9,575,424 | B2 | 2/2017 | Nakagawa |
| 9,575,425 | B2 | 2/2017 | Naka |
| 9,588,450 | B2 | 3/2017 | Tsuda |
| 9,594,323 | B2 | 3/2017 | Fujikawa |
| 9,599,919 | B2 | 3/2017 | Isono |
| 9,606,462 | B2 | 3/2017 | Nomura |
| 9,632,441 | B2 | 4/2017 | Abe |
| 9,658,546 | B2 | 5/2017 | Tanaka |
| 9,658,549 | B2 | 5/2017 | Tanaka |
| 9,715,187 | B2 | 7/2017 | Mukumoto |
| 9,715,188 | B2 | 7/2017 | Terauchi |
| 9,720,340 | B2 | 8/2017 | Tominaga |
| 9,772,570 | B2 | 9/2017 | Tsuda |
| 9,778,583 | B2 | 10/2017 | Terauchi |
| 9,785,068 | B2 | 10/2017 | Umeda |
| 9,785,071 | B2 | 10/2017 | Shimano |
| 9,804,514 | B2 | 10/2017 | Suzumura |
| 9,804,519 | B2 | 10/2017 | Suzumura |
| 9,829,814 | B2 | 11/2017 | Yoshida |
| 9,829,816 | B2 | 11/2017 | Tanaka |
| 9,835,964 | B2 | 12/2017 | Yoshida |
| 9,841,692 | B2 | 12/2017 | Hasegawa |
| 9,857,707 | B2 | 1/2018 | Tsuda |
| 9,857,711 | B2 | 1/2018 | Yoshida |
| 9,880,478 | B2 | 1/2018 | Shimano |
| 9,904,193 | B2 | 2/2018 | Nakagawa |
| 9,904,195 | B2 | 2/2018 | Matsui |
| 9,927,728 | B2 | 3/2018 | Arimura |
| 9,946,179 | B2 | 4/2018 | Arimura |
| 9,946,181 | B2 | 4/2018 | Hasegawa |
| 9,952,523 | B2 | 4/2018 | Shimano |
| 9,958,801 | B2 | 5/2018 | Tanaka |
| 9,964,874 | B2 | 5/2018 | Suzumura |
| 9,964,881 | B2 | 5/2018 | Ikejiri |
| 9,971,262 | B2 | 5/2018 | Hasegawa |
| 9,971,263 | B2 | 5/2018 | Fukudome |
| 9,971,264 | B2 | 5/2018 | Sano |
| 10,012,919 | B2 | 7/2018 | Matsui |
| 10,012,923 | B2 | 7/2018 | Sano |
| 10,054,866 | B2 | 8/2018 | Tanaka |
| 10,101,683 | B2 | 10/2018 | Nishikawa |
| 10,114,303 | B2 | 10/2018 | Katsura |
| 10,156,800 | B2 | 12/2018 | Tsuda |
| 10,197,934 | B2 | 2/2019 | Matsui |
| 10,228,627 | B2 | 3/2019 | Nagashima |
| 10,289,016 | B2 | 5/2019 | Fukudome |
| 10,295,921 | B2 | 5/2019 | Ohmori |
| 10,303,074 | B2 | 5/2019 | Yamawaki |
| 10,310,396 | B2 | 6/2019 | Kamikura |
| 10,310,397 | B2 | 6/2019 | Sano |
| 10,338,487 | B2 | 7/2019 | Kamikura |
| 10,345,726 | B2 | 7/2019 | Nakamura |
| 10,353,308 | B2 | 7/2019 | Hatakeyama |
| 10,401,750 | B2 | 9/2019 | Nakamura |
| 10,429,757 | B2 | 10/2019 | Yoshida |
| 10,503,090 | B2 | 12/2019 | Tominaga |
| 10,539,893 | B2 | 1/2020 | Tanaka |
| 10,539,899 | B2 | 1/2020 | Nakamura |
| 10,545,420 | B2 | 1/2020 | Kinumatsu |
| 10,545,422 | B2 | 1/2020 | Yamawaki |
| 10,551,758 | B2 | 2/2020 | Tanaka |
| 10,578,990 | B2 | 3/2020 | Tsuda |
| 10,635,010 | B2 | 4/2020 | Kamikura |
| 10,635,011 | B2 | 4/2020 | Umeda |
| 10,698,327 | B2 | 6/2020 | Nagashima |
| 10,732,530 | B2 | 8/2020 | Matsui |
| 10,782,623 | B2 | 9/2020 | Yoshiba |
| 10,845,721 | B2 | 11/2020 | Tanaka |
| 10,845,722 | B2 | 11/2020 | Nishikawa |
| 10,859,933 | B2 | 12/2020 | Kinumatsu |
| 10,877,387 | B2 | 12/2020 | Fukudome |
| 10,877,388 | B2 | 12/2020 | Aoki |
| 10,877,389 | B2 | 12/2020 | Kamikura |
| 10,895,815 | B2 | 1/2021 | Kamikura |
| 10,942,466 | B2 | 3/2021 | Tominaga |
| 10,976,678 | B2 | 4/2021 | Yamawaki |
| 10,976,679 | B2 | 4/2021 | Tanaka |
| 11,003,103 | B2 | 5/2021 | Kinumatsu |
| 11,003,104 | B2 | 5/2021 | Katsura |
| 11,003,105 | B2 | 5/2021 | Sato |
| 11,092,905 | B2 | 8/2021 | Fukudome |
| 11,099,493 | B2 | 8/2021 | Komiya |
| 11,112,708 | B2 | 9/2021 | Uratani |
| 11,112,710 | B2 | 9/2021 | Nakayama |
| 11,112,712 | B2 | 9/2021 | Matsunaga |
| 11,112,714 | B2 | 9/2021 | Amano |
| 11,169,458 | B2 | 11/2021 | Toyoizumi |
| 11,169,460 | B2 | 11/2021 | Kototani |
| 11,175,600 | B2 | 11/2021 | Uchiyama |
| 11,181,839 | B2 | 11/2021 | Yamashita |
| 11,181,840 | B2 | 11/2021 | Nagata |
| 11,181,844 | B2 | 11/2021 | Nagaoka |
| 11,181,845 | B2 | 11/2021 | Shimoda |
| 11,181,846 | B2 | 11/2021 | Kinumatsu |
| 11,249,408 | B2 | 2/2022 | Tsuda |
| 11,249,412 | B2 | 2/2022 | Kawamura |
| 11,256,187 | B2 | 2/2022 | Ogaki |
| 11,287,758 | B2 | 3/2022 | Matsui |
| 11,314,178 | B2 | 4/2022 | Kenmoku |
| 11,333,989 | B2 | 5/2022 | Unno |
| 11,347,157 | B2 | 5/2022 | Kamikura |
| 11,448,980 | B2 | 9/2022 | Matsui |
| 11,531,282 | B2 | 12/2022 | Kamikura |
| 11,573,519 | B2 | 2/2023 | Fumita |
| 2009/0305159 | A1 | 12/2009 | Zhou et al. |
| 2015/0004540 | A1 | 1/2015 | Ozawa |
| 2015/0010652 | A1 | 1/2015 | Kurogi |
| 2018/0120721 | A1 | 5/2018 | Obara et al. |
| 2019/0064686 | A1 | 2/2019 | Terauchi |
| 2020/0285165 | A1 * | 9/2020 | Chiba .................... G03G 9/091 |

(56) References Cited

U.S. PATENT DOCUMENTS

| | | | |
|---|---|---|---|
| 2020/0292956 | A1 | 9/2020 | Amano |
| 2021/0003934 | A1 | 1/2021 | Fumita |
| 2021/0132519 | A1 | 5/2021 | Hashimoto |
| 2021/0223731 | A1 | 7/2021 | Suzuki |
| 2021/0373450 | A1 | 12/2021 | Kawaguchi |
| 2021/0397110 | A1 | 12/2021 | Katsura |
| 2021/0405549 | A1 | 12/2021 | Ookubo |
| 2022/0026822 | A1 | 1/2022 | Sato |
| 2022/0026823 | A1 | 1/2022 | Sano |
| 2022/0121132 | A1 | 4/2022 | Yoshida |
| 2022/0121133 | A1 | 4/2022 | Yamawaki |
| 2022/0128915 | A1 | 4/2022 | Toyoda |
| 2022/0128916 | A1 | 4/2022 | Yoshida |
| 2022/0128919 | A1 | 4/2022 | Kawamura |
| 2022/0146952 | A1 | 5/2022 | Komiya |
| 2022/0146955 | A1 | 5/2022 | Nozaki |
| 2022/0171301 | A1 | 6/2022 | Suzumura |
| 2022/0171302 | A1 | 6/2022 | Sato |
| 2022/0171303 | A1 | 6/2022 | Hiramatsu |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0291601 | A1 | 9/2022 | Katsura |
| 2022/0326633 | A1 | 10/2022 | Aoki |
| 2022/0365457 | A1 | 11/2022 | Unno |
| 2022/0373916 | A1 | 11/2022 | Adachi |
| 2022/0390870 | A1 | 12/2022 | Kyuushima |
| 2022/0390871 | A1 | 12/2022 | Isono |
| 2022/0397836 | A1 | 12/2022 | Toyoda |
| 2022/0404730 | A1 | 12/2022 | Nagaoka |
| 2023/0014130 | A1 | 1/2023 | Sano |
| 2023/0015518 | A1 | 1/2023 | Nozaki |
| 2023/0042289 | A1 | 2/2023 | Tanaka |
| 2023/0047510 | A1 | 2/2023 | Tsuda |
| 2023/0047560 | A1 | 2/2023 | Saeki |
| 2023/0080900 | A1 | 3/2023 | Kamikura |
| 2023/0117448 | A1 | 4/2023 | Fukudome |
| 2023/0122974 | A1 | 4/2023 | Kagawa |

FOREIGN PATENT DOCUMENTS

| | | | |
|---|---|---|---|
| JP | 55-28750 | A | 2/1980 |
| JP | 2000-35692 | A | 2/2000 |
| JP | 2002-221820 | A | 8/2002 |
| JP | 2005-272323 | A | 10/2005 |
| JP | 2006-500605 | A | 1/2006 |
| JP | 2007-322953 | A | 12/2007 |
| JP | 2009-42343 | A | 2/2009 |
| JP | 2013-68901 | A | 4/2013 |
| JP | 2014-209197 | A | 11/2014 |
| JP | 2015-11077 | A | 1/2015 |
| JP | 2017-10002 | A | 1/2017 |
| JP | 2017-198929 | A | 11/2017 |
| JP | 2019-45578 | A | 3/2019 |
| JP | 2019-168632 | A | 10/2019 |
| JP | 2020-109511 | A | 7/2020 |
| JP | 2020-148928 | A | 9/2020 |
| JP | 2021-9251 | A | 1/2021 |
| WO | 2013/147284 | A1 | 10/2013 |
| WO | 2018/181189 | A | 10/2018 |

OTHER PUBLICATIONS

U.S. Appl. No. 18/173,255, Takayuki Toyoda, filed Feb. 23, 2023.
U.S. Appl. No. 18/173,278, Shohei Tsuda, filed Feb. 23, 2023.
U.S. Appl. No. 18/173,501, Taiji Katsura, filed Feb. 23, 2023.
U.S. Appl. No. 18/173,512, Masatake Tanaka, filed Feb. 23, 2023.
Kyowa Chemical Industry DHT-4A technical data sheet (2025).

* cited by examiner

TONER

BACKGROUND OF THE INVENTION

Field of the Invention

The present disclosure relates to a toner used in image forming methods such as electrophotography.

Description of the Related Art

In recent years, in electrophotographic image forming apparatuses such as multi-function machines and printers, there is a demand for longer service life, a smaller size, lower cost, and media tolerance.

Recently, from the viewpoint of cost reduction in offices and effective use of paper resources, users have been more frequently using less expensive rough paper and talc paper compared to the past.

Inside a printer, paper dust is easily generated from such paper. Therefore, if such paper is used continuously when one printer is used for a long period of time, the cleaning property of a photoreceptor surface decreases due to the paper dust, and the paper dust contaminates a member used for an electrification means. In some cases, the ability to impart electrification to a photoreceptor decreases. As a result, image quality is degraded at the end of the service life of the printer in some cases.

Such a demand can be met by, for example, providing a means for cleaning an electrification means or using a non-contact electrification means using a method such as a corona electrification method. However, this may lead to an increase in the cost of components and may be an obstacle in miniaturization of the printer.

On the other hand, in order to extend the service life of the printer, it is required to stabilize the electrification property of a toner even in long-term durable use of the printer.

As a means for enhancing the negative electrification property of a toner, Japanese Patent Application Laid-Open No. 2017-198929 indicates that the electrification property of a toner can be enhanced using a toner containing hydrotalcite particle.

Further, Japanese Patent Application Laid-Open No. 2021-009251 indicates that a cleaning property is improved and retransfer is curbed using a toner containing a fatty acid metal salt as a cleaning aid.

SUMMARY OF THE INVENTION

However, it was found that, in the toner according to Japanese Patent Application Laid-Open No. 2017-198929, since the hydrotalcite particle is highly a positive particle, while the electrification property of the toner is improved, the hydrotalcite particle itself becomes strongly positive in a low temperature and low humidity environment and easily aggregate electrostatically. Therefore, there is room for improvement in electrification stabilization of the toner in the long-term durable use of the printer.

In addition, in the toner according to Japanese Patent Application Laid-Open No. 2021-009251, there is room for improvement in the durability of the cleaning property of the photoreceptor surface in a case where paper that generates a large amount of paper dust is used and the printer is durably used for a long period of time in a low temperature and low humidity environment.

That is, an object of the present disclosure is to provide a toner capable of achieving a stable cleaning property and stable image quality even in a case, where paper that generates a large amount of paper dust is used and a printer is used for a long period of time in a low temperature and low humidity environment, which leads to a decrease in the cleaning property of the surface of a photoreceptor.

That is, the present disclosure relates to a toner comprising a toner particle comprising a binder resin, a fatty acid metal salt particle on a surface of the toner particle, and a hydrotalcite particle on a surface of the toner particle, wherein the hydrotalcite particle comprises fluorine, the fluorine is present inside the hydrotalcite particle in line analysis of STEM-EDS mapping analysis of the toner, and when an area ratio of the fatty acid metal salt particle to the toner particle in an EDS measurement field, which is measured through the STEM-EDS mapping analysis of the toner, is defined as S1(%) and an area ratio of the hydrotalcite particle to the toner particle in the EDS measurement field, which is measured through the STEM-EDS mapping analysis of the toner, is defined as H1(%), S1/H1 is 0.25 to 9.00.

According to the present disclosure, it is possible to provide a toner capable of achieving a stable cleaning property and stable image quality even in a case where paper that generates a large amount of paper dust is used and a printer is durably used for a long period of time in a low temperature and low humidity environment, which leads to a decrease in the cleaning property of the surface of a photoreceptor. Further features of the present invention will become apparent from the following description of exemplary embodiments with reference to the attached drawings.

DESCRIPTION OF THE EMBODIMENTS

Figure 1A:
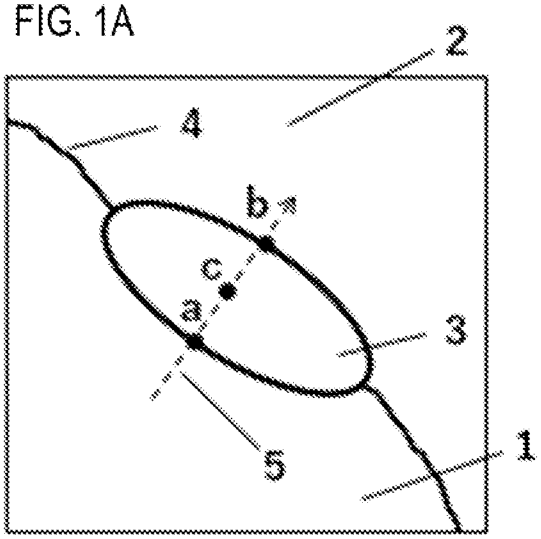
FIGS. 1A to 1C are schematic diagrams of EDS line analysis of STEM-EDS mapping analysis.

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined.

In the present disclosure, the term "(meth)acrylic" means "acrylic" and/or "methacrylic".

The inventors of the present invention have extensively studied the reason why the cleaning property easily decreases in a case where paper that generates a large amount of paper dust is used and a printer is used for a long period of time in a low temperature and low humidity environment.

As a result, they found that, in a case where paper that generates a large amount of paper dust is used in a low temperature and low humidity environment, the paper dust becomes strongly negative and easily migrates to a photoreceptor, and has a high adhesion force to the photoreceptor due to an electrostatic force, and thus it is difficult to remove the paper dust in a cleaning step.

On the other hand, when a cleaning aid such as a fatty acid metal salt is contained in the toner, a certain effect on the cleaning property is obtained. However, they found that, in a case where paper that generates a large amount of paper dust is used and a printer is durably used for a long period of time in a low temperature and low humidity environment, the cleaning property for the paper dust becomes insufficient.

In addition, they found that, in a case where hydrotalcite particle used as a microcarrier is contained in the toner in order to enhance the electrification property of the toner, the effect of the cleaning aid such as the fatty acid metal salt is impaired, and the cleaning property for the paper dust in a low temperature and low humidity environment further decreases.

The reason for this is presumed by the inventors as follows.

Since the hydrotalcite particle is highly a positive particle, they become strongly positive in a low temperature and low humidity environment.

Since the strongly positive hydrotalcite particle migrates to the photoreceptor and are supplied in the cleaning step, the strongly positive hydrotalcite particle is aggregated by involving the negative fatty acid metal salt in the cleaning step. Therefore, the dispersibility of the fatty acid metal salt in the cleaning step is lowered. As a result, it is considered that the cleaning property decreases.

The inventors of the present invention have extensively studied a toner capable of achieving a stable cleaning property and stable image quality. As a result, they found that, when the toner comprises the hydrotalcite particle comprising fluorine and the fatty acid metal salt particle, and an existence ratio of the hydrotalcite particle and the fatty acid metal salt particle is controlled to be within a certain range in STEM-EDS analysis of the toner, the cleaning property for the paper dust generated in a case where the printer is durably used for a long period of time in a low temperature and low humidity environment can be dramatically improved, and completed the present disclosure on the basis of this finding.

The present disclosure relates to a toner comprising a toner particle comprising a binder resin, a fatty acid metal salt particle on a surface of the toner particle, and a hydrotalcite particle on a surface of the toner particle, wherein the hydrotalcite particle comprises fluorine, the fluorine is present inside the hydrotalcite particle in line analysis of STEM-EDS mapping analysis of the toner, and when an area ratio of the fatty acid metal salt particle to the toner particle in an EDS measurement field, which is measured through the STEM-EDS mapping analysis of the toner, is defined as S1(%) and an area ratio of the hydrotalcite particle to the toner particle in the EDS measurement field, which is measured through the STEM-EDS mapping analysis of the toner, is defined as H1(%), S1/H1 is 0.25 to 9.00.

It is not clear why the toner having the above configuration can maintain the stable cleaning property even in a case where paper that generates a large amount of paper dust is used and the printer is durably used for a long period of time in a low temperature and low humidity environment, but the reason for this is presumed by the inventors as follows.

A toner of the present disclosure comprises a toner particle comprising a binder resin, a fatty acid metal salt particle on a surface of the toner particle and a hydrotalcite particle on a surface of the toner particle. A specific preferred fatty acid metal salt particle and a hydrotalcite particle will be described later. The hydrotalcite particle comprises fluorine. Further, the fluorine is present inside the hydrotalcite particle in line analysis of STEM-EDS mapping analysis of the toner.

The hydrotalcite particle comprising the fluorine inside is a particle that act as a microcarrier with a positive property, but unlike the hydrotalcite particle of the related art, the hydrotalcite particle comprising the fluorine inside is a positive particle that maintains an appropriate electrification amount without charging up excessively even when it is used in a low temperature and low humidity environment.

Therefore, even when the hydrotalcite particle migrates from the toner to the photoreceptor and is supplied in the cleaning step, it is possible to maintain excellent dispersibility without the fatty acid metal salt particle aggregating.

Since the paper dust and the fatty acid metal salt particle are both negative, electrostatic repulsion easily occurs between the paper dust and the fatty acid metal salt particle. Therefore, it tends to be difficult for the fatty acid metal salt to act on the paper dust, and it tends to be difficult to maintain the cleaning property for the paper dust.

In contrast, in the present disclosure, since the hydrotalcite particle is supplied in the cleaning step, the hydrotalcite particle having a moderate positive property interacts with the paper dust and the fatty acid metal salt particle having a negative property to dramatically improve the cleaning property for the paper dust.

That is, in the present disclosure, an effect of lowering an image force between the paper dust and the photoreceptor by adsorbing the negative paper dust with the hydrotalcite particle, an effect of lowering an electrostatic repulsion force between the paper dust and the fatty acid metal salt particle with the hydrotalcite particle interposed therebetween, and a lubricant effect and a release effect of the fatty acid metal salt particle are exhibited. It is conceivable that these effects act synergistically to dramatically improve the cleaning property.

In the present disclosure, when an area ratio of the fatty acid metal salt particle to the toner particle in an EDS measurement field, which is measured through the STEM-EDS mapping analysis of the toner, is defined as S1(%) and an area ratio of the hydrotalcite particle to the toner particle in the EDS measurement field, which is measured through the STEM-EDS mapping analysis of the toner, is defined as H1(%), S1/H1 is 0.25 to 9.00. Further, S1/H1 is preferably 0.35 to 6.00.

In a case where S1/H1 is less than 0.25, it means that the fatty acid metal salt particle is very few compared to the hydrotalcite particle, and thus the cleaning effect of the fatty acid metal salt particle cannot be sufficiently exhibited. As a result, the cleaning property for the paper dust decreases.

On the other hand, in a case where S1/H1 exceeds 9.00, the fatty acid metal salt particle is very many compared to the hydrotalcite particle, and thus the adsorption of the paper dust with the hydrotalcite particle and the effect of lowering the electrostatic repulsion force between the paper dust and the fatty acid metal salt particle are insufficient. As a result, the cleaning property for the paper dust decreases.

S1/H1 can be controlled with the amount of the fatty acid metal salt particle and the hydrotalcite particle added to the toner particle. Further, S1/H1 can be calculated through the STEM-EDS mapping analysis of the toner, as in a measurement method which will be described later.

A product of an atomic concentration of the fluorine in the hydrotalcite particle, which is obtained from the main component mapping of the hydrotalcite particle through the STEM-EDS mapping analysis of the toner, H1, and 100 is defined as H2, and a product of an atomic concentration of metal atoms in the fatty acid metal salt particle, which is obtained from the main component mapping of the fatty acid metal salt particle through the STEM-EDS mapping analysis of the toner, S1, and 100 is defined as S2. H2 and S2 are respectively indicators of the amount of fluorine atoms covering the toner particle surface and the amount of the metal atoms covering the toner particle surface. Further, H2 and S2 are also indicators of the positive amount of the hydrotalcite particle and the negative amount of the fatty acid metal salt particle, respectively.

At this time, S2/H2 is preferably 0.10 to 18.00, more preferably 0.19 to 16.00, further preferably 0.23 to 9.00, and particularly preferably 0.56 to 6.30. When S2/H2 is within the above range, the hydrotalcite particle and the fatty acid metal salt particle are stably supplied in the cleaning step regardless of the printing rate of an image, and both particles can effectively act on the paper dust in a cleaning part, and the cleaning property can be improved.

When S2/H2 is within the above range, a stable cleaning property can be exhibited regardless of the printing rate of the image even in a case where the printer is durably used for a long period of time in order to print images with different printing rates on the left and right sides, which is preferable. Specifically, even after a test of outputting a large number of images having a white background portion and a black background portion on the left and right sides of the image, it is possible to output a halftone image with excellent uniformity, which is preferable.

Further, when 52/H2 is within the above range, the negative property of the fatty acid metal salt particle and the positive property of the hydrotalcite particle are in an appropriate range, and the fatty acid metal salt particle and the hydrotalcite particle in the toner are integrated with each other. As a result, the frequency of migration of the particles to the photoreceptor increases.

For this reason, even in a case where the image has a portion with a high-low difference in a photoreceptor potential such as the white background portion (a portion where the negative potential of the photoreceptor is high and relatively easily attracts positive particles) and the black background portion (a portion where the negative potential of the photoreceptor is low and relatively easily attracts negative particles) and the images with different printing rates are output, the fatty acid metal salt particle and the hydrotalcite particle can be stably supplied to the photoreceptor.

As a result, it is possible to reduce the influence of the printing rate in the cleaning step and obtain an image with high uniformity in halftone image density.

S2/H2 can be controlled with the amount of the fluorine or the metal atoms introduced and the amount of the hydrotalcite particle or the fatty acid metal salt particle added.

When a number average particle diameter of primary particle of the fatty acid metal salt particle is defined as S3 (nm), and a number average particle diameter of primary particle of the hydrotalcite particle is defined as H3 (nm), it is preferable to satisfy S3>H3.

With the relationship of S3>H3, the hydrotalcite particle and the fatty acid metal salt particle easily migrate from the toner to the photoreceptor together.

Therefore, in the cleaning step, since the fatty acid metal salt particle is dispersed on the wall surface of a cleaning member and a state in which the hydrotalcite particle is carried in the fatty acid metal salt particle is easily formed, the hardness of the cleaning member increases. As a result, an excellent cleaning property can be exhibited even in an extremely low temperature and low humidity environment in which the toner easily slips through.

S3 and H3 can be controlled by a method which will be described later.

The hydrotalcite particle used in the present disclosure will be described below.

The hydrotalcite particle comprises fluorine. Here, the presence or absence of fluorine content in the hydrotalcite particle can be verified through the STEM-EDS mapping analysis of the toner.

Further, in the hydrotalcite particle, the fluorine is present inside the hydrotalcite particle in the line analysis of the STEM-EDS mapping analysis of the toner.

Specifically, this means that the EDS line analysis is performed in a direction normal to the outer periphery of the hydrotalcite particle comprising the fluorine, and the fluorine present inside the particles is detected.

The detection of the fluorine inside the hydrotalcite particle through the above analysis indicates that the fluorine is intercalated between layers of the hydrotalcite particle.

Due to the presence of the fluorine inside the hydrotalcite particle, the hydrotalcite particle can maintain a positive property of a moderate electrification amount without charging up even in a low temperature and low humidity environment. Therefore, as described above, it is possible to exhibit an excellent cleaning property.

It is presumed that the reason why the hydrotalcite particle can maintain the moderate positive electrification amount is because, since the strongly negative fluorine is present inside the hydrotalcite particle, the positive charges on the surface of the hydrotalcite particle can be taken into the inside of the particles to be neutralized, and the charge-up of the particle surface can be curbed.

The introduction of fluorine into the inside of the hydrotalcite particle is preferably performed by introducing (intercalating) fluoride ions between layers by anion exchange.

The atomic concentration of the fluorine in the hydrotalcite particle is not particularly limited, but it is preferably 0.01 atomic % to 5.00 atomic %, more preferably 0.04 atomic % to 3.00 atomic %, and further preferably 0.09 atomic % to 2.00 atomic %. Within this range, the hydrotalcite particle is moderately positive, and the microcarrier property is within the appropriate range. As a result, even in an extremely low temperature and low humidity environment in which the electrification property of the toner easily becomes high, the toner hardly slips through in the cleaning step, and an excellent cleaning property can be exhibited, which is preferable.

The atomic concentration of the fluorine in the hydrotalcite particle can be controlled by adjusting the concentration of the fluorine during production of the hydrotalcite. For example, it can be controlled by adjusting the amount of sodium fluoride added. Further, the atomic concentration of the fluorine in the hydrotalcite particle can be obtained from main component mapping of the hydrotalcite particle through the STEM-EDS mapping analysis of the toner.

A value of a ratio F/Al (an elemental ratio) in an atomic concentration of the fluorine to the aluminum in the hydrotalcite particle, which is obtained from the main component mapping of the hydrotalcite particle through the STEM-EDS mapping analysis of the toner, is preferably 0.01 to 0.70, more preferably 0.02 to 0.65, further preferably 0.03 to 0.60, and particularly preferably 0.04 to 0.32.

Within this range, in addition to the excellent paper dust cleaning property, the electrification stability of the toner in a low temperature and low humidity environment is enhanced, and the occurrence of fog in a non-image portion during long-term durable use can be curbed.

Specifically, when F/Al is 0.01 or more, the surface electrification distribution of the hydrotalcite particle can be made uniform, and the electrification stability of the toner is improved. As a result, it is possible to curb the occurrence of fog in a non-image portion during long-term durable use.

Further, when F/Al is 0.70 or less, excessive neutralization of the surface charge of the hydrotalcite particle is curbed, the time stability of the positive charge is enhanced, and the electrification stability of the toner is improved. As a result, it is possible to curb the fog in a non-image portion during long-term durable use.

A value of a ratio Mg/Al (an elemental ratio) in an atomic concentration of the magnesium to the aluminum in the hydrotalcite particle, which is obtained from the main component mapping of the hydrotalcite particle through the STEM-EDS mapping analysis of the toner, is preferably 1.5 to 4.0 and more preferably 1.6 to 3.8.

Mg/Al can be controlled by adjusting the amounts of raw materials during production of the hydrotalcite. The atomic concentration of the magnesium is preferably 0.20 atomic % to 1.00 atomic % and more preferably 0.50 atomic % to 0.80 atomic %.

The hydrotalcite particle may be one represented by the following structural formula (1):

$$M^{2+}{}_{y}M^{3+}{}_{x}(OH)_2A^{n-}{}_{(x/n)}\cdot mH_2O \quad (1)$$

in which $M^{2+}$ and $M^{3+}$ represent bivalent and trivalent metals, respectively.

The hydrotalcite particle may be a solid solution containing multiple different elements. It may also contain a trace amount of a monovalent metal.

However, preferably $0<x\leq 0.5$, $y=1-x$, and $m\geq 0$.

$M^{2+}$ is preferably at least one bivalent metal ion selected from the group consisting of Mg, Zn, Ca, Ba, Ni, Sr, Cu and Fe.

$M^{3+}$ is preferably at least one trivalent metal ion selected from the group consisting of Al, B, Ga, Fe, Co and In.

$A^{n-}$ is an anion having a valency of n, and includes at least $F^-$, and $CO_3{}^{2-}$, $OH^-$, $Cl^-$, $I^-$, $Br^-$, $SO_4{}^{2-}$, $HCO_3{}^-$, $CH_3COO^-$, $NO_3{}^-$, and the like, may also be present, or a plurality of different anions may be present.

The divalent metal ion $M^{2+}$ is preferably magnesium, and the trivalent metal ion $M^{3+}$ is preferably aluminum. Further, the hydrotalcite particle of the present disclosure preferably comprises aluminum and magnesium.

Examples of a specific compositional formula include $Mg_{8.6}Al_4(OH)_{25.2}F_2CO_3\cdot mH_2O$, $Mg_{12}Al_4(OH)_{32}F_2CO_3\cdot mH_2O$, and the like.

Moreover, the hydrotalcite particle preferably has water in their molecules and more preferably $0.1<m<0.6$ in formula (1).

The number average particle diameter H3 of primary particle of the hydrotalcite particle is preferably 40 nm to 1100 nm, more preferably 50 nm to 1000 nm, and further preferably 60 nm to 800 nm.

When the number average particle diameter of the hydrotalcite particle is within the above range, the toner has an excellent electrification rising property, it is easy to sharpen the electrification distribution of the toner, and the halftone reproducibility in a low temperature and low humidity environment is improved.

The above particle diameter can be measured using a known means such as a scanning electron microscope. In addition, the particle diameter can be controlled by controlling the conditions of a reaction step, a pulverization step, a centrifugation step, a classification step, and a sieving step in the production process of the hydrotalcite particle.

The hydrotalcite particle may be hydrophobized with a surface treatment agent. Higher fatty acids, coupling agents, esters, and oils such as a silicone oil can be used as the surface treatment agent. Among them, the higher fatty acids are preferably used, and specific examples include stearic acid, oleic acid, and lauric acid.

The content of the hydrotalcite particle in the toner is not particularly limited, but it is preferably 0.01 parts by mass to 3.00 parts by mass, more preferably 0.05 parts by mass to 0.50 parts by mass, and further preferably 0.05 parts by mass to 0.30 parts by mass with respect to 100 parts by mass of the toner particle. The content of the hydrotalcite particle can be quantified using a calibration curve prepared from a standard sample using fluorescent X-ray analysis.

The area ratio H1(%) of the hydrotalcite particle to the toner particle in the EDS measurement field, which is measured through the STEM-EDS mapping analysis of the toner, is preferably 0.05 to 0.50, more preferably 0.07 to 0.41, and further preferably 0.14 to 0.33. The above area ratio represents an existence ratio of the hydrotalcite particle to the toner particle.

Within the above range, it is easy to obtain the above effects of the hydrotalcite particle.

The above area ratio can be controlled by changing the amount of the hydrotalcite particle added to the toner particle.

Next, the fatty acid metal salt particle used in the present disclosure will be described.

A salt of at least one metal selected from the group consisting of zinc, calcium, magnesium, aluminum and lithium is preferable as the fatty acid metal salt particle. Fatty acid zinc is more preferable in terms of further improving the cleaning property in an extremely low temperature and low humidity environment.

Further, a higher fatty acid having 8 to 28 carbon atoms (more preferably 12 to 22 carbon atoms) is preferable as a fatty acid of the fatty acid metal salt particle. The metal is preferably a polyvalent metal having a valence of 2 or more. That is, a fatty acid metal salt of a polyvalent metal having a valence of 2 or more (more preferably a valence of 2 or 3 and further preferably a valence of 2) and a fatty acid having 8 to 28 carbon atoms (more preferably 12 to 22 carbon atoms) is preferable as the fatty acid metal salt particle.

When a fatty acid having 8 or more carbon atoms is used, the melting point of the fatty acid metal salt becomes moderately high, contamination of an electrification member such as a developing blade is curbed, and fog and an electrification rising property after long-term durable use are improved, which is preferable.

On the other hand, when the number of carbon atoms in the fatty acid is 28 or less, the melting point of the fatty acid metal salt particle does not become too high, and the fixability is less likely to be impaired.

A stearic acid is particularly preferred as the fatty acid. The polyvalent metal having a valence of 2 or more preferably contains zinc.

Examples of the fatty acid metal salt particle include metal stearates such as zinc stearate, calcium stearate, magnesium stearate, aluminum stearate, and lithium stearate and zinc laurate.

The number average particle diameter S3 of primary particle of the fatty acid metal salt particle is preferably 350 nm to 1100 nm and more preferably 400 nm to 1000 nm.

When the number average particle diameter of the primary particle of the fatty acid metal salt particle is within the above range, the cleaning property in a low temperature and low humidity environment is further improved.

The above particle diameter can be measured using a known means such as a scanning electron microscope. In addition, the particle diameter can be controlled by controlling the conditions of a reaction step, a pulverization step, a centrifugation step, a classification step, and a sieving step in the production process of the fatty acid metal salt particle.

The content of the fatty acid metal salt particle is not particularly limited, but it is preferably 0.01 parts by mass to 0.40 parts by mass, more preferably 0.05 parts by mass to 0.30 parts by mass, and further preferably 0.10 parts by mass to 0.20 parts by mass with respect to 100 parts by mass of the toner particle. The content of the fatty acid metal salt particle can be quantified using a calibration curve prepared from a standard sample using fluorescent X-ray analysis.

Within the above range, the cleaning property and the halftone reproducibility in a low temperature and low humidity environment are further improved.

The atomic concentration of the metal atoms in the fatty acid metal salt particle is not particularly limited, but it is preferably 0.10 atomic % to 3.00 atomic %, more preferably 0.20 atomic % to 2.00 atomic %, and further preferably 0.30 atomic % to 1.00 atomic %. Within this range, the fatty acid metal salt particle has a moderate negative property, and the repulsion force against the paper dust is curbed to a moderate range, and thus the cleaning property in a low temperature and low humidity environment can be improved.

The atomic concentration of the metal atoms in the fatty acid metal salt particle can be controlled by adjusting the concentration of the metal atoms during production of the fatty acid metal salt particle. Further, the atomic concentration of the metal atoms in the fatty acid metal salt particle can be obtained from main component mapping of the fatty acid metal salt particle through the STEM-EDS mapping analysis of the toner.

The area ratio S1(%) of the fatty acid metal salt particle to the toner particle in the EDS measurement field, which is measured through the STEM-EDS mapping analysis of the toner, is preferably 0.05 to 0.70, more preferably 0.10 to 0.60, and further preferably 0.20 to 0.40. The above area ratio represents an existence ratio of the fatty acid metal salt particle to the toner particle.

Within the above range, it is easy to obtain the above effects of the fatty acid metal salt particle.

The above area ratio can be controlled by changing the amount of the fatty acid metal salt particle added to the toner particle.

Each component constituting the toner and a method for manufacturing the toner will be described in more detail.

Toner Particle

The toner particle comprises a binder resin.

Further, the toner particle preferably has a core-shell structure having a core containing a resin A and a shell containing a resin B.

In the present disclosure, the fact that the toner particle has a core-shell structure means that the toner particle surface is coated with a resin component different from a wax component. The presence or absence of the core-shell structure can be verified by observing a cross section of the toner with a transmission electron microscope (TEM).

Since the toner particle has the core-shell structure, it is possible to curb the hydrotalcite particle and the fatty acid metal salt particle from being buried in the toner particle during long-term durable use, and the hydrotalcite particle and the fatty acid metal salt particle normally migrate to the photoreceptor and are easily supplied to the cleaning part.

A shell layer may be thinner or thicker than 0.1 μm. The thickness of the shell layer is preferably 0.1 μm or less. More preferably, it is 50 nm or less. The thickness of the shell is preferably 1 nm or more.

An example of a method for analyzing the thickness of the shell layer will be shown below.

Measurement by time-of-flight secondary ion mass spectrometry: The thickness of the shell is defined as the depth at which a ratio of a signal derived from the shell and a signal derived from the core becomes 1:1 in a case where depth profile measurement is performed. The thickness of the shell can be controlled with the amount of the raw material used for the shell added during production of the toner particle.

Binder Resin

The core comprises the resin A as the binder resin. Examples of the resin A include a polyester resin, vinyl resins, and the following resins or polymers as other binder resins. Examples of the binder resin include a styrene-acrylic resin, a polyester resin, an epoxy resin, a polyurethane resin, a polyamide resin, a cellulose resin, a polyether resin, a mixed resin thereof, a composite resin thereof, and the like.

The resin A is preferably the polyester resin, the styrene-acrylic resin, or a hybrid resin thereof and more preferably the polyester resin or the styrene-acrylic resin, because they are inexpensive and readily available and have excellent low-temperature fixability.

In a case where the toner particle does not have the core-shell structure, the above resins used as the resin A can be preferably used.

The polyester resin can be obtained by using a conventional well-known method, such as a transesterification method or a polycondensation method, by selecting and combining appropriate materials from among polycarboxylic acids, polyols, hydroxycarboxylic acids, and the like.

A polycarboxylic acid is a compound having 2 or more carboxyl groups per molecule. Of these, a dicarboxylic acid is a compound having 2 carboxyl groups per molecule, and is preferably used.

Examples of dicarboxylic acids include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid.

Examples of polycarboxylic acids other than the dicarboxylic acids mentioned above include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid and n-octenylsuccinic acid. It is possible to use one of these polycarboxylic acids in isolation or a combination of two or more types thereof.

A polyol is a compound having 2 or more hydroxyl groups per molecule. Of these, a diol is a compound having 2 hydroxyl groups per molecule, and is preferably used.

Specific examples include ethylene glycol, diethylene glycol, triethylene glycol, 1,2-propylene glycol, 1,3-propylene glycol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,18-octadecane diol, 1,14-eicosane diol, dipropylene glycol, polyethylene glycol, polypropylene glycol, polytetramethylene ether glycol, 1,4-cyclohexane diol, 1,4-cyclohexane dimethanol, 1,4-butene diol, neopentyl glycol, 1,4-cyclohexane diol, polytetramethylene glycol, hydrogenated bisphenol A, bisphenol A, bisphenol F, bisphenol S, and alkylene oxide (ethylene oxide, propylene oxide, butylene oxide and the like) adducts of these bisphenol compounds.

Of these, alkylene glycols having 2 to 12 carbon atoms and alkylene oxide adducts of bisphenol compounds are preferred, and alkylene oxide adducts of bisphenol compounds and combinations of alkylene oxide adducts of bisphenol compounds and alkylene glycols having 2 to 12 carbon atoms are particularly preferred.

Examples of trihydric or higher polyols include glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac and alkylene oxide adducts of the trihydric or higher polyphenol compounds listed above. It is possible to use one of these trihydric or higher polyols in isolation or a combination of two or more types thereof. In addition, the polyester resin may be a urea group-containing polyester resin. The polyester resin is preferably one in which a carboxyl group at a terminal or the like is not capped.

Examples of styrene acrylic resins include homopolymers comprising polymerizable monomers listed below, copolymers obtained by combining two or more of these polymerizable monomers, and mixtures of these.

Styrene-based monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; (meth)acrylic monomers such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth)acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth)acrylate, (meth) acrylic acid and maleic acid;

Vinyl ether-based monomers such as vinyl methyl ether and vinyl isobutyl ether; and vinyl ketone-based monomers such as vinyl methyl ketone, vinyl ethyl ketone and vinyl isopropenyl ketone;

Polyolefins of ethylene, propylene, butadiene, and the like.

The styrene acrylic resin can be obtained using a polyfunctional polymerizable monomer if necessary. Examples of polyfunctional polymerizable monomers include diethylene glycol di(meth)acrylate, triethylene glycol di(meth)acrylate, tetraethylene glycol di(meth)acrylate, polyethylene glycol di(meth)acrylate, 1,6-hexane diol di(meth)acrylate, neopentyl glycol di(meth)acrylate, tripropylene glycol di(meth)acrylate, polypropylene glycol di(meth)acrylate, 2,2'-bis(4-((meth)acryloxydiethoxy)phenyl)propane, trimethylolpropane tri(meth)acrylate, tetramethylolpropane tetra(meth)acrylate, divinylbenzene, divinylnaphthalene and divinyl ether.

In addition, it is possible to further add well-known chain transfer agents and polymerization inhibitors in order to control the degree of polymerization.

Examples of polymerization initiators used for obtaining the styrene acrylic resin include organic peroxide-based initiators and azo-based polymerization initiators.

Examples of organic peroxide-based initiators include benzoyl peroxide, lauroyl peroxide, di-α-cumyl peroxide, 2,5-dimethyl-2,5-bis(benzoyl peroxy)hexane, bis(4-t-butylcyclohexyl) peroxydicarbonate, 1,1-bis(t-butyl peroxy)cyclododecane, t-butyl peroxymaleic acid, bis(t-butyl peroxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide and tert-butyl-peroxypivalate.

Examples of azo type initiators include 2,2'-azobis(2,4-dimethylvaleronitrile), 2,2'-azobisisobutyronitrile, 1,1'-azobis(cyclohexane-1-carbontrile), 2,2'-azobis-4-methoxy-2,4-dimethylvaleronitrile, azobis(methylbutyronitrile) and 2,2'-azobis-(methylisobutyrate).

In addition, a redox type initiator obtained by combining an oxidizing substance with a reducing substance can be used as a polymerization initiator.

Examples of oxidizing substances include inorganic peroxides such as hydrogen peroxide and persulfates (sodium salts, potassium salts and ammonium salts), and oxidizing metal salts such as tetravalent cerium salts.

Examples of reducing substances include reducing metal salts (divalent iron salts, monovalent copper salts and trivalent chromium salts), ammonia, amino compounds such as lower amines (amines having from 1 to 6 carbon atoms, such as methylamine and ethylamine) and hydroxylamine, reducing sodium compounds such as sodium thiosulfate, sodium hydrosulfite, sodium hydrogen sulfite, sodium sulfite and aldehyde sulfoxylates, lower alcohols (having from 1 to 6 carbon atoms), ascorbic acid and salts thereof, and lower aldehydes (having from 1 to 6 carbon atoms).

The polymerization initiator is selected with reference to 10-hour half-life decomposition temperatures, and can be a single polymerization initiator or a mixture thereof. The added amount of polymerization initiator varies according to the target degree of polymerization, but is generally an amount of from 0.5 parts by mass to 20.0 parts by mass relative to 100.0 parts by mass of polymerizable monomer.

Moreover, the resin A may comprise a crystalline polyester. Examples of the crystalline polyester include a condensation polymer of an aliphatic diol and an aliphatic dicarboxylic acid.

It is preferably a condensation polymer of an aliphatic diol having 2 to 12 carbon atoms and an aliphatic dicarboxylic acid having 2 to 12 carbon atoms. Examples of the aliphatic diol having 2 to 12 carbon atoms include the following compounds. A 1,2-ethanediol, a 1,3-propanediol, a 1,4-butanediol, a 1,5-pentanediol, a 1,6-hexanediol, a 1,7-heptanediol, a 1,8-octanediol, a 1,9-nonanediol, a 1,10-decanediol, a 1,11-undecanediol, a 1,12-dodecanediol, and the like.

Further, an aliphatic diol with a double bond may also be used. Examples of the aliphatic diol having a double bond include the following compounds. A 2-butene-1,4-diol, a 3-hexene-1,6-diol, and a 4-octene-1,8-diol.

Examples of the aliphatic dicarboxylic acid having 2 to 12 carbon atoms include the following compounds. An oxalic acid, a malonic acid, a succinic acid, a glutaric acid, an adipic acid, a pimelic acid, a suberic acid, an azelaic acid, a sebacic acid, a 1,9-nonanedicarboxylic acid, a 1,10-decanedicarboxylic acid, a 1,11-undecanedicarboxylic acid, a 1,12-dodecanedicarboxylic acid, and a lower alkyl ester and an acid anhydride of these aliphatic dicarboxylic acids.

Among these, the sebacic acid, the adipic acid, the 1,10-decanedicarboxylic acid, and the lower alkyl ester and the acid anhydride thereof are preferred. These may be used alone, or two or more of them may be mixed and used.

Further, an aromatic dicarboxylic acid may also be used. Examples of the aromatic dicarboxylic acid include the following compounds. A terephthalic acid, an isophthalic acid, a 2,6-naphthalenedicarboxylic acid, and a 4,4'-biphenyldicarboxylic acid. Among these, the terephthalic acid is preferable in terms of availability and easy formation of a low-melting polymer.

Further, a dicarboxylic acid having a double bond can also be used. The dicarboxylic acid having a double bond can be suitably used for curbing hot offset during fixing in that the double bond can be used to crosslink the entire resin.

Examples of such a dicarboxylic acid includes a fumaric acid, a maleic acid, a 3-hexenedioic acid, and a 3-octenedioic acid. Further, the examples also include a lower alkyl ester and an acid anhydride thereof. Among these, the fumaric acid and the maleic acid are more preferred.

A method for producing the crystalline polyester is not particularly limited, and it can be produced by a general polyester polymerization method in which a dicarboxylic acid component and a diol component are reacted with each other. For example, a direct polycondensation method or a transesterification method can be used for production, depending on the types of monomers.

The content of the crystalline polyester is preferably 1.0 parts by mass to 30.0 parts by mass and more preferably 3.0 parts by mass to 25.0 parts by mass with respect to 100 parts by mass of the binder resin.

The peak temperature of the maximum endothermic peak of the crystalline polyester measured using a differential scanning calorimeter (DSC) is preferably 50.0° C. to 100.0° C. and more preferably 50.0° C. to 90.0° C. from the viewpoint of low temperature fixability.

As the molecular weight of the resin A, a peak molecular weight Mp is preferably from 5,000 to 100,000 and more preferably 10,000 to 40,000. The glass transition temperature Tg of the resin A is preferably 40° C. to 70° C. and more preferably 40° C. to 60° C. The content of the resin A is preferably 50% by mass or more with respect to the total amount of the resin components in the toner particle. Further, the content of the resin A in the binder resin is preferably 50% by mass to 100% by mass.

The shell comprises the resin B. Examples of the resin B include a polyester resin, vinyl resins, and the same materials as those described in the resin A as other binder resins. The resin B is preferably the polyester resin, the styrene-acrylic resin, or a hybrid resin thereof and more preferably the polyester resin or the styrene-acrylic resin, because they are inexpensive and readily available and have excellent low-temperature fixability.

A material that is the same as or different from that of the resin A as a material type can be used as the resin B. For example, the styrene-acrylic resin can be used as the resin A and the resin B, the polyester resin can be used as the resin A and the resin B, or the styrene-acrylic resin can be used as the resin A and the polyester resin can be used as the resin B.

Preferably, the resin A comprises the styrene-acrylic resin, and the resin B comprises the styrene-acrylic resin. Further, preferably, the resin A comprises the polyester resin, and the resin B comprises the polyester resin. Further, preferably, the resin A comprises the styrene-acrylic resin, and the resin B comprises the polyester resin.

As the molecular weight of the resin B, Mp is preferably 5,000 to 100,000 and more preferably 15,000 to 80,000.

The glass transition temperature Tg of the resin B is preferably 50° C. to 100° C., more preferably from 55° C. to 80° C., and further preferably 60° C. to 80° C. From the viewpoint of curbing the hydrotalcite particle A from being buried in the toner particle during fixing, it is preferable to select a material having a Tg higher than that of the resin A for the resin B.

The content of the resin B is preferably 1% by mass to 30% by mass with respect to the total amount of the resin components in the toner particle.

Crosslinking Agent

To control the molecular weight of the binder resin constituting the toner particle, a crosslinking agent may also be added during polymerization of the polymerizable monomers.

Examples include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinyl benzene, bis (4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester diacrylate (MANDA, Nippon Kayaku Co., Ltd.), and these with methacrylate substituted for the acrylate.

The added amount of the crosslinking agent is preferably from 0.001 to 15.000 mass parts per 100 mass parts of the polymerizable monomers.

Release Agent

A well-known wax can be used as a release agent in the toner.

Specific examples thereof include petroleum-based waxes and derivatives thereof, such as paraffin waxes, microcrystalline waxes and petrolatum, montan wax and derivatives thereof, hydrocarbon waxes and derivatives thereof obtained using the Fischer Tropsch process, polyolefin waxes and derivatives thereof, such as polyethylene waxes and polypropylene waxes, and natural waxes and derivatives thereof, such as carnauba wax and candelilla wax. Derivatives include oxides, block copolymers formed with vinyl monomers, and graft-modified products.

Further examples include higher aliphatic alcohols; fatty acids, such as stearic acid and palmitic acid, and amides, esters and ketones of these acids; hydrogenated castor oil and derivatives thereof, plant waxes and animal waxes. It is possible to use one of these release agents in isolation, or a combination thereof.

Among these, the hydrocarbon wax and the ester wax are preferred because they tend to improve developability and fixability. That is, the wax preferably contains hydrocarbon wax or ester wax. An antioxidant may be added to these waxes to the extent that the property of the toner is not affected.

From the viewpoint of phase separation with respect to the binder resin or crystallization temperature, suitable examples of a higher fatty acid ester include behenyl behenate and dibehenyl sebacate. Further, the ester wax can also be suitably used as a plasticizing agent which will be described later.

The content of the release agent is preferably from 1.0 parts by mass to 30.0 parts by mass relative to 100.0 parts by mass of the binder resin.

The melting point of the release agent is preferably from 30° C. to 120° C., and more preferably from 60° C. to 100° C. By using a release agent having a melting point of from 30° C. to 120° C., a releasing effect is efficiently achieved and a broader fixing range is ensured.

Plasticizer

A crystalline plasticizer is preferably used in order to improve the sharp melt properties of the toner. The plasticizer is not particularly limited, and well-known plasticizers used in toners, such as those listed below, can be used.

Examples thereof include esters of monohydric alcohols and aliphatic carboxylic acids and esters of monohydric carboxylic acids and aliphatic alcohols, such as behenyl behenate, stearyl stearate and palmityl palmitate; esters of dihydric alcohols and aliphatic carboxylic acids and esters of dihydric carboxylic acids and aliphatic alcohols, such as ethylene glycol distearate, dibehenyl sebacate and hexane diol dibehenate; esters of trihydric alcohols and aliphatic carboxylic acids and esters of trihydric carboxylic acids and aliphatic alcohols, such as glycerin tribehenate; esters of tetrahydric alcohols and aliphatic carboxylic acids and esters of tetrahydric carboxylic acids and aliphatic alcohols, such as pentaerythritol tetrastearate and pentaerythritol tetrapalmitate; esters of hexahydric alcohols and aliphatic carboxylic acids and esters of hexahydric carboxylic acids and aliphatic alcohols, such as dipentaerythritol hexastearate and dipentaerythritol hexapalmitate; esters of polyhydric alcohols and aliphatic carboxylic acids and esters of polycarboxylic acids and aliphatic alcohols, such as polyglycerol behenate; and natural ester waxes such as carnauba wax and rice wax. It is possible to use one of these plasticizers in isolation, or a combination thereof Colorant The toner particle may contain a colorant. A well-known pigment or dye can be used as the colorant. From the perspective of excellent weathering resistance, a pigment is preferred as the colorant.

Examples of cyan colorants include copper phthalocyanine compounds and derivatives thereof, anthraquinone compounds and basic dye lake compounds.

Specific examples thereof include the following. C.I. Pigment Blue 1, 7, 15, 15:1, 15:2, 15:3, 15:4, 60, 62 and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds and perylene compounds.

Specific examples thereof include the following. C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254, and C.I. Pigment Violet 19.

Examples of yellow colorants include condensed azo compounds, isoindolinone compounds, anthraquinone compounds, azo metal complexes, methine compounds and allylamide compounds.

Specific examples thereof include the following. C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191 and 194.

Examples of black colorants include carbon black and materials colored black using the yellow colorants, magenta colorants and cyan colorants mentioned above.

It is possible to use one of these colorants in isolation, or a combination thereof, and these can be used in the form of solid solutions.

The content of the colorant is preferably from 1.0 parts by mass to 20.0 parts by mass relative to 100.0 parts by mass of the binder resin.

Charge Control Agent and Charge Control Resin

The toner particle may contain a charge control agent or a charge control resin. A well-known charge control agent can be used, and a charge control agent which has a fast triboelectric charging speed and can stably maintain a certain triboelectric charge quantity is particularly preferred. Furthermore, in a case where a toner particle is produced using a suspension polymerization method, a charge control agent which exhibits low polymerization inhibition properties and which is substantially insoluble in an aqueous medium is particularly preferred.

Examples of charge control agents that impart the toner particle with negative chargeability include monoazo metal compounds, acetylacetone metal compounds, aromatic oxycarboxylic acid, aromatic dicarboxylic acid, oxycarboxylic acid and dicarboxylic acid-based metal compounds, aromatic oxycarboxylic acids, aromatic mono- and poly-carboxylic acids and metal salts, anhydrides and esters thereof, phenol derivatives such as bisphenol, urea derivatives, metal-containing salicylic acid-based compounds, metal-containing naphthoic acid-based compounds, boron compounds, quaternary ammonium salts, calixarenes and charge control resins.

It is possible to use a polymer or copolymer having a sulfonic acid group, a sulfonic acid salt group or a sulfonic acid ester group as the charge control resin. It is particularly preferable for a polymer having a sulfonic acid group, a sulfonic acid salt group or a sulfonic acid ester group to contain a sulfonic acid group-containing acrylamide-based monomer or a sulfonic acid group-containing methacrylamide-based monomer at a copolymerization ratio of 2 mass % or more, and more preferably 5 mass % or more.

The charge control resin preferably has a glass transition temperature (Tg) of from 35° C. to 90° C., a peak molecular weight (Mp) of from 10,000 to 30,000, and a weight average molecular weight (Mw) of from 25,000 to 50,000. In a case where this is used, it is possible to impart preferred triboelectric charging characteristics without adversely affecting thermal characteristics required of the toner particle. Furthermore, if the charge control resin contains a sulfonic acid group, dispersibility of the charge control resin per se in the polymerizable monomer composition and dispersibility of the colorant and the like are improved, and tinting strength, transparency and triboelectric charging characteristics can be further improved.

It is possible to add one of these charge control agents or charge control resins in isolation, or a combination of two or more types thereof.

The added amount of the charge control agent or charge control resin is preferably from 0.01 parts by mass to 20.0 parts by mass, and more preferably from 0.5 parts by mass to 10.0 parts by mass, relative to 100.0 parts by mass of the binder resin.

From the viewpoint of improving the electrification rising property in the low temperature and low humidity environment, the toner particle preferably has at least one polyvalent metal element selected from the group consisting of aluminum, magnesium, calcium, and iron and more preferably contains the aluminum among them. When the toner particle contains the polyvalent metal element, since the electrification charges on the surface of the toner particle can be accumulated inside the toner particle, the electrification property of the toner are less likely to fluctuate even during long-term durable use.

Therefore, even in a low temperature and low humidity environment where the absolute water content is particularly small and the electrification amount distribution of the toner is severe, the hydrotalcite particle and the fatty acid metal salt particle can stably migrate to the photoreceptor to be supplied to the cleaning part, and a stable cleaning property for the paper dust can be exhibited.

The content (the atomic concentration) of the polyvalent metal element in the toner particle is preferably 0.01 to 0.09 and more preferably 0.01 to 0.06 in a case where the atomic concentration of carbon in the toner particle is 100. The content of the polyvalent metal element in the toner particle can be measured from main component mapping of the toner particle through the STEM-EDS mapping analysis which will be described later. Within the above range, the electrification rising property in a low temperature and low humidity environment is improved.

A means for allowing the polyvalent metal element to exist inside the toner particle is not particularly limited. For example, in a case where the toner particle is produced by a pulverization method, the polyvalent metal element can be contained in a resin of a raw material in advance, or the polyvalent metal element can be added to the toner particle when the raw material is melted and kneaded. In a case where the toner particle is produced by a wet production method such as a suspension polymerization method or an emulsion aggregation method, the polyvalent metal element can also be contained in the raw material, or the polyvalent metal element can also be added to the raw material via an aqueous medium during the production process.

In the emulsion aggregation method, metal ions may be added as an aggregating agent. In this case, the metal element can be ionized in the aqueous medium to be contained in the toner particle, which is preferable from the viewpoint of uniformity. Furthermore, in the emulsion aggregation toner, a carboxyl group may exist in a molecular chain constituting the binder resin. The metal ions added as an aggregating agent coordinate with the carboxyl group to form an excellent conductive path in resin fine particle. Further, at this time, the aluminum having a valence of 3 can be coordinated with the carboxyl group in a smaller amount than the magnesium and the calcium having a valence of 2, and the iron that can have mixed valences, and thus more excellent electrification property can be easily obtained.

Preferably, the resin A has the carboxyl group. A means for allowing the carboxyl group to be contained in the resin A is not particularly limited. In a case where the resin A is the styrene-acrylic resin, a monomer having a carboxyl group, such as a (meth)acrylic acid, may be used.

Method for Producing Toner Particle

A method for producing the toner particle is not particularly limited, a known means can be used, and a kneading pulverization method or a wet production method can be used. The wet production method is preferable from the viewpoint of uniformity of the particle diameter, shape controllability, and ease of obtaining a toner particle having a core-shell structure. Examples of the wet production method can include a suspension polymerization method, a dissolution suspension method, an emulsion polymerization aggregation method, an emulsion aggregation method, and the like. Here, the emulsion aggregation method is more preferable from the viewpoint of dispersing the polyvalent metal element on the surface of the toner particle and inside the toner particle.

In the emulsion aggregation method, a dispersion liquid of a material such as fine particle of the binder resin and the coloring agent is prepared. The obtained dispersion liquid of each material is dispersed and mixed by adding a dispersion stabilizer thereinto as necessary. After that, the toner particle is aggregated to have a desired particle diameter by adding an aggregating agent thereinto, and thereafter or simultaneously with the aggregation, fusing is performed between the resin fine particle. Further, as necessary, the toner particle is formed by shape control with heat.

Here, the fine particle of the binder resin can also be composite particle formed of a plurality of layers of two or more layers made of resins having different compositions. For example, the toner particle can be produced by an emulsion polymerization method, a mini-emulsion polymerization method, a phase inversion emulsification method, or a combination of some production methods. In a case where an internal additive is contained in the toner particle, the internal additive may be contained in the resin fine particle. Further, a dispersion liquid of internal additive fine particle containing only the internal additive may be separately prepared, and when the internal additive fine particle and the resin fine particle is aggregated, they may be aggregated together. In addition, the toner particle having a layer structure with different compositions can be produced by adding the resin fine particle with different compositions at the time of aggregation with a time lag and causing them to aggregate. After a core portion is formed by aggregating the resin fine particle containing the resin A, a shell portion can be formed by adding and aggregating the resin fine particle containing the resin B for the shell with a time lag.

Specifically, after an aggregation particle (core particle) containing the resin A are formed by an aggregation step, a shell forming step in which the resin fine particle containing the resin B for the shell are further added and aggregated to form a shell is provided. As the resin B for the shell, a resin having the same composition as the resin A for the core may be used, or a resin having a different composition may be used. The amount of the resin for the shell added is preferably 1.0 to 10.0 parts by mass and more preferably 2.0 to 7.0 parts by mass with respect to 100 parts by mass of the binder resin contained in the core particle.

In this case, a method for producing the toner preferably includes the following steps.

(1) A dispersion step of preparing a binder resin fine particle dispersion liquid containing a binder resin such as the resin A (2) An aggregation step of aggregating the binder resin fine particle contained in the binder resin fine particle dispersion liquid to form aggregates (3) A shell forming step of further adding resin fine particle containing the resin B for the shell to the dispersion liquid containing the aggregate and aggregating the mixture to form the aggregates having the shell (4) A fusion step of heating and fusing the aggregates Further, it is preferable to include the following step (5) during the step (4) or after the steps (1) to (4).

(5) A spheronizing step of heating the aggregates by further raising a temperature Furthermore, it is more preferable to include the following steps (6) and (7) after the step (5).

(6) A cooling step of cooling the aggregates at a cooling rate of 0.1° C./sec or more (7) An annealing step of heating and holding the aggregates at a temperature equal to or higher than the crystallization temperature or the glass transition temperature of the binder resin after the cooling step Substances listed below can be used as dispersion stabilizers.

Well-known cationic surfactants, anionic surfactants and non-ionic surfactants can be used as surfactants.

Examples of inorganic dispersion stabilizers include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina. In addition, examples of organic dispersion stabilizers include poly (vinyl alcohol), gelatin, methyl cellulose, methylhydroxypropyl cellulose, ethyl cellulose, sodium carboxymethyl cellulose and starch.

In addition to surfactants having the opposite polarity from surfactants used in the dispersion stabilizers mentioned above, inorganic salts and divalent or higher inorganic metal salts can be advantageously used as flocculants. Inorganic metal salts are particularly preferred from the perspectives of facilitating control of aggregation properties and toner charging performance due to polyvalent metal elements being ionized in aqueous media.

Specific examples of preferred inorganic metal salts include metal salts such as calcium chloride, calcium nitrate, barium chloride, magnesium chloride, zinc chloride, iron chloride, aluminum chloride and aluminum sulfate; and inorganic metal salt polymers such as iron polychloride, aluminum polychloride, aluminum polyhydroxide and calcium polysulfide. Of these, aluminum salts and polymers thereof are particularly preferred. In order to attain a sharper particle size distribution, it is generally preferable for the valency of an inorganic metal salt to be divalent rather than monovalent and trivalent or higher rather than divalent, and an inorganic metal salt polymer is more suitable for a given valency.

From the perspectives of high image precision and resolution, the volume-based median diameter of the toner particle is preferably from 3.0 μm to 10.0 μm.

Method for Producing Toner

The toner comprises the hydrotalcite particle and the fatty acid metal salt particle as external additives. Other external additives may be added as necessary. In this case, the content of external additives such as inorganic and organic fine particles including the hydrotalcite particle and the fatty acid metal salt particle is preferably 0.50 parts by mass to 5.00 parts by mass in total with respect to 100 parts by mass of the toner particle.

A mixer for externally adding the external additives to the toner particle is not particularly limited, and known mixers can be used regardless of whether they are dry or wet. For example, FM Mixer (manufactured by Nippon Coke Kogyo Co., Ltd.), Super Mixer (manufactured by Kawata Co., Ltd.), Nobilta (manufactured by Hosokawa Micron Co., Ltd.), Hybridizer (manufactured by Nara Machinery Co., Ltd.), and the like are enumerated. In order to control the coating state of the external additives, the toner can be prepared by adjusting the rotational speed of the external addition device, the processing time, and the water temperature and amount of a jacket.

Further, examples of a sieving device used for sieving coarse particles after external addition include Ultrasonic (manufactured by Koei Sangyo Co., Ltd.); Resona Sieve, Gyro Shifter (Tokuju Kosakusho Co., Ltd.); Vibra Sonic System (manufactured by Dalton Co., Ltd.); Soniclean (manufactured by Sintokogyo Co., Ltd.); Turbo Screener (manufactured by Turbo Kogyo Co., Ltd.); and Micro Shifter (manufactured by Makino Sangyo Co., Ltd.).

A methods for measuring physical properties of the toner and each material will be described below.

Method for Identifying Hydrotalcite Particle and Fatty Acid Metal Salt Particle

Identification of the hydrotalcite particle and the fatty acid metal salt particle, which are external additives, can be performed by combining shape observation by scanning electron microscope (SEM) and elemental analysis by energy dispersive X-ray spectroscopy (EDS).

Using a scanning electron microscope "S-4800" (a trade name, manufactured by Hitachi Ltd.), the toner is observed in a field magnified up to 50,000 times. The external additive to be discriminated is observed by focusing on the toner particle surface. The EDS analysis is performed on the external additive to be discriminated, and the hydrotalcite particle and the fatty acid metal salt particle can be identified from the type of an elemental peak.

In a case where an elemental peak of at least one metal selected from the group consisting of Mg, Zn, Ca, Ba, Ni, Sr, Cu, and Fe, which are metals that can constitute the hydrotalcite particle, and an elemental peak of at least one metal selected from the group consisting of Al, B, Ga, Fe, Co, and In are observed as the elemental peak, it is possible to presume that the hydrotalcite particle containing the above two metals are present.

In a case where an elemental peak of at least one metal selected from the group consisting of Zn, Ca, Mg, Al, and Li, which are metals that can constitute the fatty acid metal salt particle, and an elemental peak of the carbon are observed as the elemental peak, it is possible to presume that the fatty acid metal salt particle is present.

Specimens of the hydrotalcite particle and the fatty acid metal salt particle presumed by the EDS analysis are separately prepared, and the shape observation by the SEM and the EDS analysis are performed. The analysis results of the specimens are compared with the analysis result of the particles to be discriminated in order to determine whether or not they match each other, and thus it is determined whether or not they are the hydrotalcite particle and the fatty acid metal salt particle.

Method for Measuring Elemental Ratio of Hydrotalcite Particle, Fatty Acid Metal Salt Particle, and Polyvalent Metal Element in Toner Particle The elemental ratio of the hydrotalcite particle, the fatty acid metal salt particle, and the polyvalent metal element in the toner particle is measured through EDS mapping measurement of the toner using a scanning transmission electron microscope (STEM). In the EDS mapping measurement, spectral data for each picture element (pixel) in the analysis area is used. EDS mapping can be measured with high sensitivity by using a silicon drift detector with a large detection element area.

By statistically analyzing the spectral data of each pixel obtained through the EDS mapping measurement, main component mapping in which pixels with similar spectra are extracted can be obtained, enabling mapping with specified components.

A sample for observation is prepared according to the following procedure.

0.5 g of the toner is weighed and placed in a cylindrical mold with a diameter of 8 mm using a Newton press under a load of 40 kN for 2 minutes to prepare a cylindrical toner pellet with a diameter of 8 mm and a thickness of about 1 mm. 200 nm thick flakes are produced from the toner pellet by an ultramicrotome (Leica, FC7).

STEM-EDS analysis is performed using the following device and conditions.

Scanning transmission electron microscope: JEM-2800 manufactured by JEOL Ltd.

EDS detector: JED-2300T dry SD100GV detector (detection element area: 100 $mm^2$) manufactured by JEOL Ltd.

EDS analyzer: NORAN System 7 manufactured by Thermo Fisher Scientific Ltd.

STEM-EDS Conditions

STEM acceleration voltage: 200 kV

Magnification: 20,000 times

Probe size 1 nm

STEM image size: 1024×1024 pixels (to obtain an EDS elemental mapping image at the same position)

EDS mapping size: 256×256 pixels, Dwell Time: 30 μs, accumulation count: 100 frames A polyvalent metal element ratio in the toner particle and each elemental ratio in the fatty acid metal salt particle and the hydrotalcite particle based on multivariate analysis are calculated as follows.

The EDS mapping is obtained by the above STEM-EDS analyzer. Next, the multivariate analysis is performed on the collected spectral mapping data using a COMPASS (PCA) mode in a measurement command of the NORAN System 7 described above to extract a main component map image.

At that time, the setting values are as follows.

Kernel size: 3×3

Quantitative map setting: high (late)

Filter fit type: high precision (slow)

At the same time, through this operation, the area ratio of each extracted main component in the EDS measurement field is calculated. Quantitative analysis is performed on the EDS spectrum of the obtained main component mapping by a Cliff-Lorimer method.

The toner particle portion, the hydrotalcite particle, and the fatty acid metal salt particle are distinguished on the basis of the above quantitative analysis results of the obtained STEM-EDS main component mapping. The particle can be identified as the hydrotalcite particle from the particle size, the shape, the content of polyvalent metals such as aluminum and magnesium, and the amount ratio thereof. Similarly, the particle can be identified as the fatty acid metal salt particle from the particle size, the shape, the content of the metal contained in the fatty acid metal salt particle, and the amount ratio thereof.

Method for Calculating Area Ratios H1 and S1 of Hydrotalcite Particle and Fatty Acid Metal Salt Particle to Toner Particle and S1/H1

On the basis of the mapping data of the STEM-EDS mapping analysis of the toner obtained by the method described above, the area ratio of each extracted main component to the toner particle can be calculated. The value obtained by taking the "area ($nm^2$) of the hydrotalcite particle" as the numerator and the "sum of the area ($nm^2$) of the hydrotalcite particle and the area ($nm^2$) of the toner particle" as the denominator is calculated as the area ratio H1 of the hydrotalcite particle to the toner particle.

The value obtained by taking the "area ($nm^2$) of the fatty acid metal salt particle" as the numerator and the "sum of the area ($nm^2$) of the fatty acid metal salt particle and the area ($nm^2$) of the toner particle" as the denominator is calculated as the area ratio S1 of the fatty acid metal salt particle to the toner particle.

The mapping data are acquired in a plurality of fields, and the area ratio H1(%) of the hydrotalcite particle to the toner particle in the EDS measurement field and the area ratio S1(%) of the fatty acid metal salt particle to the toner particle in the EDS measurement field are calculated. The arithmetic averages of the 30 fields are assumed to be the area ratios H1 and S1.

Then, S1/H1 is calculated from the obtained H1 and S1.

Here, in the identification of the fatty acid metal salt particle in the mapping data, the determination is made based on whether or not the structures of the fatty acid metal salt particle obtained by isolation, the types of the metal atoms contained in the fatty acid metal salt particle, and the atomic ratios of the carbon atoms and the metal atoms contained in the fatty acid metal salt particle match each other in the items of the identification of the fatty acid metal salt particle.

Method for Analyzing Fluorine and Aluminum in Hydrotalcite Particle

On the basis of the mapping data of the STEM-EDS mapping analysis obtained by the method described above, the hydrotalcite particle is analyzed for the fluorine and the aluminum. Specifically, the EDS line analysis is performed in a direction normal to the outer periphery of the hydrotalcite particle to analyze the fluorine and the aluminum present inside the particle.

A schematic diagram of the line analysis is shown in FIG. 1A. For the hydrotalcite particle 3 adjacent to the toner particle 1 and the toner particle 2, line analysis is performed in a direction normal to the outer periphery of the hydrotalcite particle 3, that is, in a direction of 5. Reference sign 4 indicates a boundary between each toner particle.

A range in which hydrotalcite particle is present in an acquired STEM image is selected with a rectangular selection tool, and the line analysis is performed under the following conditions.

Line Analysis Conditions

STEM magnification: 800,000 times

Line length: 200 nm

Line width: 30 nm

The number of line divisions: 100 points (intensity measurement every 2 nm)

In a case where the elemental peak intensity of the fluorine or the aluminum is 1.5 times or more the background intensity in the EDS spectrum of the hydrotalcite particle, and in a case where the elemental peak intensity of the fluorine or the aluminum at each of both end portions (a point a and a point b in FIG. 1A) of the hydrotalcite particle in the line analysis does not exceed 3.0 times the peak intensity at a point c, the element is determined to be contained inside the hydrotalcite particle. The point c is a midpoint of a line segment ab (that is, a midpoint between both end portions).

Figure 1B:
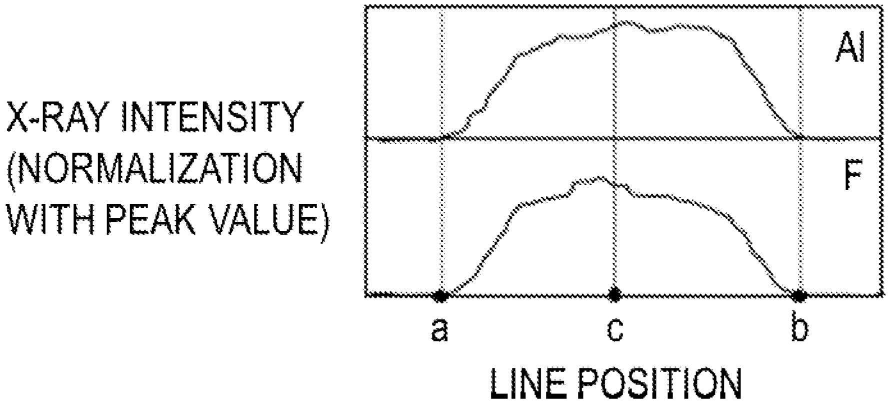
Figure 1C:
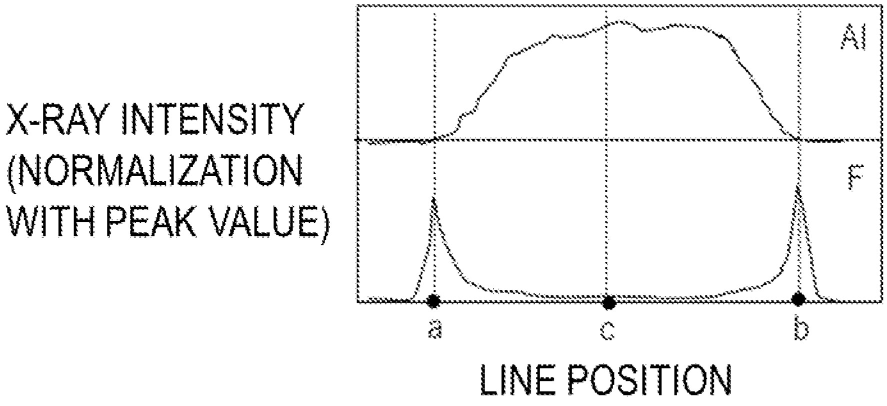

Examples of X-ray intensities of the fluorine and the aluminum obtained through the line analysis are shown in FIGS. 1B and 1C. In a case where the hydrotalcite particle comprises the fluorine and the aluminum inside, a graph of the X-ray intensity normalized with the peak intensity shows a shape as shown in FIG. 1B. In a case where the hydrotalcite particle comprises fluorine derived from the surface treatment agent, a graph of the X-ray intensity normalized with the peak intensity has a peak near each of the points a and b at both end portions in a graph of the fluorine as shown in FIG. 1C. By checking the X-ray intensity derived from the fluorine and the aluminum in the line analysis, it can be verified that the hydrotalcite particle comprises the fluorine and the aluminum inside.

Method for Calculating Value of Ratio (Elemental Ratio) F/Al in Atomic Concentration of Fluorine to Aluminum in Hydrotalcite Particle By acquiring a value of a ratio F/Al (an elemental ratio) in an atomic concentration of the fluorine to the aluminum in the hydrotalcite particle, which is obtained from the main component mapping derived from the hydrotalcite particle through the STEM-EDS mapping analysis described above, in a plurality of fields, and by obtaining an arithmetic average of 100 or more particles, the value of the ratio (the elemental ratio) F/Al in the atomic concentration of the fluorine to the aluminum in the hydrotalcite particle is obtained.

Method for Calculating Value of Ratio (Elemental Ratio) Mg/Al in Atomic Concentration of Magnesium to Aluminum in Hydrotalcite Particle The same method as the above-described method for calculating a ratio (an elemental ratio) F/Al in an atomic concentration of the fluorine to the aluminum in the hydrotalcite particle is performed for the magnesium and the aluminum, and thus the ratio (the elemental ratio) Mg/Al in an atomic concentration of the magnesium to the aluminum in the hydrotalcite particle is calculated.

Method for Calculating Atomic Concentration of Fluorine in Hydrotalcite Particle, Atomic Concentration of Metal Atoms in Fatty Acid Metal Salt Particle, and 52/H2

On the basis of the mapping data of the STEM-EDS mapping analysis obtained by the method described above, the atomic concentration of the fluorine in the hydrotalcite particle and the atomic concentration of the metal atoms in the fatty acid metal salt particle are calculated. In the main component map images of the hydrotalcite particle and the fatty acid metal salt particle, which are extracted by the above-mentioned method, the atomic concentration (the elemental amount) of the fluorine in the hydrotalcite particle and the atomic concentration (the elemental content) of the metal atoms in the fatty acid metal salt particle are quantified. H2 and S2 are calculated by multiplying the atomic concentration of the fluorine in the hydrotalcite particle by H1 and 100, and by multiplying the atomic concentration of the metal atoms in the fatty acid metal salt particle by S1 and 100.

H2 and S2 are obtained by acquiring the mapping data in a plurality of fields and by taking the arithmetic average of 100 or more hydrotalcite particles and 100 or more fatty acid metal salt particles.

Then, 52/H2 is calculated from the obtained H2 and S2.

Method for Measuring Number Average Particle Diameter H3 of Primary Particle of Hydrotalcite Particle and Number Average Particle Diameter S3 of Primary Particle of Fatty Acid Metal Salt Particle The number average particle diameter H3 of the primary particle of the hydrotalcite particle and the number average particle diameter S3 of the primary particle of the fatty acid metal salt particle are measured by combining a scanning electron microscope "S-4800" (a trade name, manufactured by Hitachi, Ltd.) and elemental analysis through the energy dispersive X-ray spectroscopy (EDS). The toner to which the hydrotalcite particle and the fatty acid metal salt particle are externally added as the external additives is observed, and the hydrotalcite particle and the fatty acid metal salt particle are photographed in a field magnified up to 200,000 times. The hydrotalcite particle and the fatty acid metal salt particle are selected from the photographed images, the major diameters of the primary particle of 100 hydrotalcite particles and 100 fatty acid metal salt particles are measured at random, and the number average particle diameter of the hydrotalcite particle and the number average particle diameter of the fatty acid metal salt particle are obtained. The observation magnification is appropriately adjusted according to the size of the external additive.

Method for Calculating Polyvalent Metal Element Content in Toner Particle

The elemental amounts (the atomic concentrations) of the polyvalent metal element and the carbon in the toner particle are obtained from the main component mapping derived from the toner particle through the STEM-EDS mapping analysis described above. The elemental amount (the atomic concentration) of the polyvalent metal element such as the aluminum in a case where the elemental amount (the atomic concentration) of the carbon is 100 is defined as the "content of the polyvalent metal element in the toner particle." The "content of the polyvalent metal element in the toner particle" is calculated by acquiring the mapping data in a plurality of fields and by taking the arithmetic average for 100 or more toner particles.

Method for Measuring Glass Transition Temperature (Tg) of Resin

The glass transition temperature of the resin is measured according to ASTM D3418-97.

Specifically, 10 mg of the resin obtained through drying is accurately weighed and put in an aluminum pan. An empty aluminum pan is used as a reference. The glass transition temperature of the accurately weighed resin is measured using a differential scanning calorimeter (manufactured by SII Nanotechnology Co., Ltd., product name: DSC6220) according to ASTM D3418-97 in the measurement temperature range of 0° C. to 150° C. under the condition of a temperature increase rate of 10° C./min.

Identification of Wax in Toner (1) Method for Separating Wax From Toner

First, the melting point of the wax in the toner is measured using a thermal analyzer (DSC Q2000, manufactured by TA Instruments Japan Co., Ltd.). A toner sample of 3.0 mg is put in a sample container of an aluminum pan (KIT No. 0219-0041), and the sample container is placed on a holder unit and set in an electric furnace. The toner sample is heated from 30° C. to 200° C. at a temperature increase rate of 10° C./min in a nitrogen atmosphere, a DSC curve is measured by a differential scanning calorimeter (DSC), and the melting point of the wax in the toner sample is calculated.

Next, the toner is dispersed in ethanol, which is a poor solvent for the toner, and heated to a temperature exceeding the melting point of the wax. At this time, pressurization may be applied as necessary. Through this operation, the wax having a temperature exceeding the melting point is melted and extracted into the ethanol. The wax can be separated from the toner by performing solid-liquid separation while heating and further pressurizing. Next, the wax is obtained by drying and solidifying the extraction liquid.

(2) Identification of Wax Through Pyrolysis GCMS

Specific conditions for identifying the wax through pyrolysis GCMS will be shown below.

Mass spectrometer: ISQ manufactured by Thermo Fisher Scientific Inc.

GC device: Focus GC manufactured by Thermo Fisher Scientific Inc.

Ion source temperature: 250° C.

Ionization method: EI

Mass range: from 50 to 1000 m/z

Column: HP-5MS [30 m]

Pyrolyzer: JPS-700 manufactured by Japan Analytical Industry Co., Ltd.

A small amount of the wax separated through the extraction operation and 1 μL of tetramethylammonium hydroxide (TMAH) are added to a pyrofoil at 590° C. The prepared sample is subjected to the pyrolysis GCMS measurement under the above conditions to obtain a peak derived from the wax. When the wax is an ester compound, peaks are obtained for each of the alcohol component and the carboxylic acid component. The alcohol component and the carboxylic acid component are detected as a methylated product through the action of TMAH which is a methylating agent. The molecular weight can also be obtained by analyzing the obtained peaks and identifying the structure of the ester compound.

Compositional Analysis of Binder Resin

Method for Separating Binder Resin from Toner 100 mg of a toner is dissolved in 3 mL of chloroform. Next, insoluble components are removed by subjecting the obtained solution to suction filtration using a syringe equipped with a sample treatment filter (having a pore size of from 0.2 μm to 0.5 μm, for example a Mishoridisk H-25-2 produced by Tosoh Corporation). Soluble components are introduced into a preparative HPLC apparatus (LC-9130 NEXT produced by Japan Analytical Industry Co., Ltd., preparative columns [60 cm], exclusion limits: 20000 and 70000, 2 linked columns), and a chloroform eluant is flushed through the columns. If a peak shown on the obtained chromatograph can be confirmed, a retention time corresponding to a molecular weight of 2000 or more is fractionated with a monodispersed polystyrene standard sample. A binder resin is obtained by drying/solidifying the solution of the obtained fraction.

Identification of Binder Resin Components and Measurement of Mass Ratio by Nuclear Magnetic Resonance (NMR)

1 mL of deuterated chloroform is added to 20 mg of a toner, and a proton NMR spectrum is measured for the dissolved binder resin. Molar ratios and mass ratios of monomers are calculated from the obtained NMR spectrum, and the content values of constituent monomer units in the binder resin, such as a styrene acrylic resin, can be determined. For example, in the case of a styrene-acrylic copolymer, compositional ratios and mass ratios can be calculated from a peak in the vicinity of 6.5 ppm, which is derived from styrene monomer, and a peak derived from an acrylic monomer in the vicinity of 3.5 to 4.0 ppm. In addition, in the case of a copolymer of a polyester resin and a styrene acrylic resin, molar ratios and mass ratios are calculated from peaks derived from monomers that constitute the polyester resin and peaks derived from the styrene-acrylic copolymer.

NMR apparatus: JEOL RESONANCE ECX500

Observation nuclei: protons, measurement mode: single pulse, reference peak: TMS Component Identification of Resin B for Shell by Time-of-flight Secondary Ion Mass Spectrometry (TOF-SIMS)

In the time-of-flight secondary ion mass spectrometry (TOF-SIMS), information at several nanometers from the surface of the toner particle can be obtained, and thus it is possible to identify the constituent materials near the outermost surface of the toner particle. TRIFT-IV manufactured by ULVAC-PHI, Inc. is used to identify the resin present on the surface of the toner particle using TOF-SIMS. The analysis conditions are as follows.

Sample preparation: the toner is adhered to an Indium sheet.

Sample pretreatment: none

Primary ion: Au ion

Accelerating voltage: 30 kV

Charge neutralization mode: On

Measurement mode: Negative

Raster: 100 μm

From each peak, the composition of the resin existing on the surface of the toner particle is identified and the existence ratio is calculated. For example, S211 is a peak derived from a bisphenol A. Further, for example, S85 is a peak derived from butyl acrylate.

In the case of calculation of the peak intensity (S85) derived from a vinyl resin: the total count number of mass numbers 84.5 to 85.5 is defined as the peak intensity (S85) according to ULVAC-PHI standard software (Win Cadense).

In the case of calculation of the peak intensity (S211) derived from amorphous polyester: the total count number of mass numbers 210.5 to 211.5 is defined as the peak intensity (S211) according to ULVAC-PHI standard software (Win Cadense).

Method for Measuring Average Circularity of Toner (Particle)

The average circularity of the toner or the toner particle is measured using a flow type particle image analyzer "FPIA-3000" (manufactured by Sysmex Corporation) under the measurement and analysis conditions during calibration work.

After an appropriate amount of a surfactant and an alkylbenzenesulfonate are added to 20 mL of ion-exchanged water as a dispersant, 0.02 g of a measurement sample is added thereto, and dispersion treatment is performed using a tabletop type ultrasonic cleaning and dispersion device with an oscillation frequency of 50 kHz and an electrical output of 150 watts (a trade name: VS-150, manufactured by Vervoclear Co., Ltd.) for 2 minutes to obtain a dispersion liquid for measurement. At that time, the temperature of the dispersion liquid is appropriately cooled to from 10° C. to 40° C.

For the measurement, the above-mentioned flow type particle image analyzer equipped with a standard objective lens (10 times) is used, and a particle sheath "PSE-900A" (manufactured by Sysmex Corporation) is used as a sheath liquid. The dispersion liquid prepared according to the above procedure is introduced into the flow type particle image analyzer, 3000 toners (toner particle) are measured in the HPF measurement mode and the total count mode, and the average circularity of the toners (the toner particle) is obtained by setting the binarization threshold during particle analysis to 85% and limiting the analyzed particle diameter to a circle equivalent diameter of 1.98 μm to 19.92 μm.

In the measurement, automatic focus adjustment is performed using standard latex particle (diluted with, for example, 5100A (a trade name) manufactured by Duke Scientific Co., Ltd. as ion-exchanged water) before starting the measurement. After that, it is preferable to perform focus adjustment every two hours from the start of measurement.

Measurement of Weight Average Molecular Weight Mw, Number Average Molecular Weight Mn and Peak Molecular Weight The molecular weight distribution (weight average molecular weight Mw, number average molecular weight Mn and peak molecular weight) of a resin or the like is measured by means of gel permeation chromatography (GPC), in the manner described below.

First, a sample is dissolved in tetrahydrofuran (THF) at room temperature over a period of 24 hours. A sample solution is then obtained by filtering the obtained solution using a solvent-resistant membrane filter having a pore diameter of 0.2 μm (a "Mishoridisk" produced by Tosoh Corporation). Moreover, the sample solution is adjusted so that the concentration of THF-soluble components is 0.8 mass %. Measurements are carried out using this sample solution under the following conditions.

Apparatus: HLC8120 GPC (detector: RI) (available from Tosoh Corporation)

Column: Combination of seven Shodex columns (KF-801, 802, 803, 804, 805, 806 and 807 produced by Showa Denko Kabushiki Kaisha)

Eluant: Tetrahydrofuran (THF)

Flow rate: 1.0 mL/min

Oven temperature: 40.0° C.

Injected amount: 0.10 mL

When calculating the molecular weight of the sample, a molecular weight calibration curve is prepared using standard polystyrene resins (for example, the products "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

Method for Measuring Melting Point

The melting point of a crystalline material (a crystalline resin or wax) is measured using a differential scanning calorimeter (DSC) Q2000 (manufactured by TA Instruments) under the following conditions.

Temperature increase rate: 10° C./min

Measurement start temperature: 20° C.

Measurement end temperature: 180° C.

The melting points of indium and zinc are used to correct the temperature of the device detecting unit, and the fusion heat of indium is used to correct the heat quantity.

Specifically, about 5 mg of a sample is accurately weighed, put in an aluminum pan, and measured once. An empty aluminum pan is used as a reference. The peak temperature of the maximum endothermic peak at that time is defined as a melting point.

Method for Measuring Particle Diameter, Such as Volume-Based Median Diameter, of Toner The particle diameter such as volume-based median diameter of the toner is calculated as follows. A "Multisizer 3 Coulter Counter" precise particle size distribution analyzer (registered trademark, Beckman Coulter, Inc.) based on the pore electrical resistance method and equipped with a 100 μm aperture tube is used as the measurement unit together with the accessory dedicated "Beckman Coulter Multisizer 3 Version 3.51" software (Beckman Coulter, Inc.) for setting the measurement conditions and analyzing the measurement data. Measurement is performed with 25,000 effective measurement channels.

The aqueous electrolytic solution used in measurement may be a solution of special grade sodium chloride dissolved in ion-exchanged water to a concentration of about 1 mass %, such as "ISOTON II" (Beckman Coulter, Inc.) for example.

The following settings are performed on the dedicated software prior to measurement and analysis.

On the "Change standard measurement method (SOMME)" screen of the dedicated software, the total count number in control mode is set to 50,000 particles, the number of measurements to 1, and the Kd value to a value obtained with "Standard particles 10.0 μm" (Beckman Coulter, Inc.). The threshold and noise level are set automatically by pushing the "Threshold/noise level measurement" button. The current is set to 1600 μA, the gain to 2, and the electrolytic solution to ISOTON II, and a check is entered for "Aperture tube flush after measurement".

On the "Conversion settings from pulse to particle diameter" screen of the dedicated software, the bin interval is set to the logarithmic particle diameter, the particle diameter bins to 256, and the particle diameter range to 2 to 60 μm.

The specific measurement methods are as follows.

(1) About 200 mL of the aqueous electrolytic solution is placed in a glass 250 mL round-bottomed beaker dedicated to the Multisizer 3, the beaker is set on the sample stand, and stirring is performed with a stirrer rod counter-clockwise at a rate of 24 rps. Contamination and bubbles in the aperture tube are then removed by the "Aperture tube flush" function of the dedicated software.

(2) 30 mL of the same aqueous electrolytic solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries, Ltd.) diluted about three times by mass with ion-exchange water is added.

(3) An ultrasonic disperser "Ultrasonic Dispersion System Tetra150" (Nikkaki Bios Co., Ltd.) with an electrical output of 120 W equipped with two built-in oscillators having an oscillating frequency of 50 kHz with their phases shifted by 180° from each other is prepared. About 3.3 L of ion-exchange water is added to the water tank of the ultrasonic disperser, and about 2 mL of Contaminon N is added to the tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolytic solution in the beaker.

(5) The aqueous electrolytic solution in the beaker of (4) above is exposed to ultrasound as about 10 mg of toner is added bit by bit to the aqueous electrolytic solution, and dispersed. Ultrasound dispersion is then continued for a further 60 seconds. During ultrasound dispersion, the water temperature in the tank is adjusted appropriately to from 10° C. to 40° C.

(6) The aqueous electrolytic solution of (5) above with the toner dispersed therein is dripped with a pipette into the round-bottomed beaker of (1) above set on the sample stand, and adjusted to a measurement concentration of about 5%. Measurement is then performed until the number of measured particles reaches 50000.

(7) The volume-based median diameter is calculated by analyzing measurement data using the accompanying dedicated software.

Method for Identifying Fatty Acid Metal Salt (1) Method for Isolating Fatty Acid Metal Salt Particle from Toner 160 g of sucrose (manufactured by Kishida Chemical Co., Ltd.) is added to 100 mL of ion-exchanged water and dissolved in a hot water bath to prepare a concentrated sucrose solution. 31 g of the concentrated sucrose solution and 6 mL of Contaminon N (a 10% by mass aqueous solution of a neutral detergent for cleaning precision measuring instruments at pH 7 formed of a nonionic surfactant, an anionic surfactant, and an organic builder, manufactured by Wako Pure Chemical Industries, Ltd.) are put in a centrifugation tube (capacity 50 ml). 1.0 g of the toner is added thereto, and the lumps of the toner are loosened with a spatula or the like.

The centrifugation tube is shaken for 20 minutes at 300 spm (strokes per min) in a shaker (AS-1N sold by As One Corporation). After shaking, the solution is replaced in a swing rotor glass tube (50 mL) and separated in a centrifuge (H-9R manufactured by Kokusan Co., Ltd.) at 3500 rpm for 30 minutes.

Through this operation, it was visually verified that the toner particle and the aqueous solution were sufficiently separated, and the toner particle separated in the uppermost layer was collected with a spatula or the like, and thus the toner particle was separated from the dispersion liquid.

After that, the dispersion liquid from which the toner particle is collected had been subjected to centrifugal separation again, and the dispersion liquid containing the fatty acid metal salt separated in the uppermost layer was collected.

Then, the above operation was repeated to collect the dispersion liquid containing the fatty acid metal salt, and then centrifugal separation was performed again to obtain a concentrated liquid having an increased concentration of the fatty acid metal salt.

After air-drying the concentrated liquid for one day, it is dried in a dryer at 40° C. for 8 hours or longer to obtain a sample for measurement. This operation was performed several times to secure the required amount of the isolated fatty acid metal salt particle.

(2) Identification of Central Metal with Fluorescent X-ray

Using the isolated fatty acid metal salt particle, fluorescent X-ray measurement was performed and composition analysis was performed to identify the metal element of the fatty acid metal salt particle.

(3) Identification of Fatty Acid of Fatty Acid Metal Salt Through Pyrolysis GCMS Specific conditions for identifying the fatty acid metal salt through pyrolysis GCMS will be shown below.

Mass spectrometer: ISQ manufactured by Thermo Fisher Scientific Inc.
GC device: Focus GC manufactured by Thermo Fisher Scientific Inc.
Ion source temperature: 250° C.
Ionization method: EI
Mass range: from 50 to 1000 m/z
Column: HP-5MS [30 m]
Pyrolyzer: JPS-700 manufactured by Japan Analytical Industry Co., Ltd.

The fatty acid metal salt separated through the isolation operation and 1 μL of tetramethylammonium hydroxide (TMAH) are added to a pyrofoil at 590° C. The prepared sample is subjected to the pyrolysis GCMS measurement under the above conditions to obtain a peak derived from the fatty acid metal salt. The fatty acid alcohol component is detected as a methylated product through the action of TMAH which is a methylating agent. The obtained peaks were analyzed to identify the fatty acid structure of the fatty acid metal salt.

EXAMPLES

The present disclosure will be described in more detail below with reference to examples and comparative examples, but the present disclosure is not limited to these. "Parts" used in the examples are based on mass unless otherwise specified.

Production examples of the toner will be described below.

Production Example of Toner 1

Preparation Example of Resin Particle Dispersion Liquid 1

Styrene: 72.0 parts
Butyl acrylate: 26.7 parts
Acrylic acid: 1.3 parts
n-lauryl mercaptan: 3.2 parts The above materials were put into a container and mixed by stirring. An aqueous solution of 150.0 parts of ion-exchanged water of 1.5 parts of Neogen RK (manufactured by Dai-ichi Kogyo Seiyaku Co., Ltd.) was added to the solution to be dispersed therein.

Further, an aqueous solution of 10.0 parts of ion-exchanged water of 0.3 parts of potassium persulfate was added while slowly stirring the mixture for 10 minutes. After nitrogen substitution, emulsion polymerization was carried out at 70° C. for 6 hours. After completion of the polymerization, the reaction solution was cooled to room temperature, and ion-exchanged water was added to obtain a resin particle dispersion liquid 1 having a solid content concentration of 12.5% by mass and a glass transition temperature of 48° C. When the particle size distribution of the resin particle contained in this resin particle dispersion liquid 1 was measured using a particle size measuring device (LA-920, manufactured by Horiba, Ltd.), the number average particle diameter of the contained resin particle was 0.2 μm. Moreover, a coarse particle exceeding 1 μm was not observed.

Preparation Example of Resin Particle Dispersion Liquid 2

Styrene: 77.0 parts
Butyl acrylate: 21.7 parts
Acrylic acid: 1.3 parts
n-lauryl mercaptan: 3.2 parts The above materials were put into a container and mixed by stirring. An aqueous solution of 150.0 parts of ion-exchanged water of 1.5 parts of Neogen RK (manufactured by Dai-ichi Kogyo Seiyaku Co., Ltd.) was added to the solution to be dispersed therein.

Further, an aqueous solution of 10.0 parts of ion-exchanged water of 0.3 parts of potassium persulfate was added while slowly stirring the mixture for 10 minutes. After nitrogen substitution, emulsion polymerization was carried out at 70° C. for 6 hours. After completion of the polymerization, the reaction solution was cooled to room temperature, and ion-exchanged water was added to obtain a resin particle dispersion liquid 2 having a solid content concentration of 12.5% by mass and a glass transition temperature of 60° C. When the particle size distribution of the resin particle contained in this resin particle dispersion liquid 2 was measured using a particle size measuring device (LA-920, manufactured by Horiba, Ltd.), the number average particle diameter of the contained resin particle was 0.2 μm. Moreover, a coarse particle exceeding 1 μm was not observed.

Preparation Example of Release Agent Dispersion Liquid 1

100.0 parts of pentaerythritol tetrastearate (a melting point: 77° C.) and 15.0 parts of Neogen RK were mixed with 385.0 parts of ion-exchanged water, and the mixture was dispersed using a wet jet mill JN100 (manufactured by Joko Co., Ltd.) for about 1 hour to obtain a release agent dispersion liquid 1. The wax concentration of the release agent dispersion liquid 1 was 20.0% by mass.

When the particle size distribution of the release agent particle contained in this release agent dispersion liquid 1 was measured using a particle size measuring device (LA-920, manufactured by Horiba, Ltd.), the number average particle diameter of the contained release agent particle was 0.35 μm. Moreover, a coarse particle exceeding 1 μm was not observed.

Preparation Example of Release Agent Dispersion Liquid 2

100.0 parts of hydrocarbon wax HNP-9 (manufactured by Nippon Seiro Co., Ltd., melting point: 75.5° C.) and 15 parts of Neogen RK were mixed with 385.0 parts of ion-exchanged water, and the mixture was dispersed using a wet jet mill JN100 (manufactured by Joko Co., Ltd.) for about 1 hour to obtain a release agent dispersion liquid 2. The wax concentration of the release agent dispersion liquid 2 was 20.0% by mass.

When the particle size distribution of the release agent particle contained in this release agent dispersion liquid 2 was measured using a particle size measuring device (LA-920, manufactured by Horiba, Ltd.), the number average particle diameter of the contained resin agent particle was 0.35 Moreover, a coarse particle exceeding 1 μm was not observed.

Preparation Example of Coloring Agent Dispersion Liquid 1

100.0 parts of carbon black "Nipex 35 (manufactured by Orion Engineered Carbons)" as a coloring agent and 15 parts of Neogen RK were mixed with 885.0 parts of ion-exchanged water, and the mixture was dispersed using the wet jet mill JN100 for about 1 hour to obtain a coloring agent dispersion liquid.

When the particle size distribution of the coloring agent particle contained in this coloring agent dispersion liquid 1 was measured using a particle size measuring device (LA-920, manufactured by Horiba, Ltd.), the number average particle diameter of the contained coloring agent particle was 0.2 Moreover, a coarse particle exceeding 1 μm was not observed.

Preparation of Toner Particle 1

Resin particle dispersion liquid 1: 265.0 parts
Release agent dispersion liquid 1: 10.0 parts
Release agent dispersion liquid 2: 8.0 parts
Coloring agent dispersion liquid 1: 16.0 parts As a core forming step, the above materials were put into a round stainless steel flask and mixed with each other therein. Subsequently, the mixture was dispersed using a homogenizer (manufactured by IKA: Ultra Turrax T50) at 5000 r/min for 10 minutes. The temperature in the container was adjusted to 30° C. while stirring, and a 1 mol/L sodium hydroxide aqueous solution was added to the mixture to adjust the pH to 8.0.

As an aggregating agent, an aqueous solution obtained by dissolving 0.25 parts of aluminum chloride in 10.0 parts of ion-exchanged water was added to the above mixture over 10 minutes while being stirred at 30° C. After the mixture was left for 3 minutes, the temperature was raised to 60° C. to generate an aggregation particle (core formation). The volume-based median diameter of the formed aggregation particle was conveniently verified using "Coulter Counter Multisizer 3" (a registered trademark, manufactured by Beckman Coulter, Inc.). When the volume-based median diameter reached 7.0 μm, 15.0 parts of the resin particle dispersion liquid 2 was put and stirred for 1 hour to form a shell as a shell forming step.

Thereafter, a 1 mol/L sodium hydroxide aqueous solution was added to the mixture to adjust the pH to 9.0, and the temperature was then raised to 95° C. to spheroidize the aggregation particle. When the average circularity reached 0.980, the temperature was lowered, and the mixture was cooled to room temperature to obtain a toner particle dispersion liquid 1.

Hydrochloric acid was added to the obtained toner particle dispersion liquid 1 to adjust the pH to 1.5 or less, and the mixture was left with stirred for 1 hour, and then solid-liquid separation was performed by a pressure filter to obtain a toner cake. This toner cake was reslurried with ion-exchanged water to form a dispersion liquid again and then subjected to solid-liquid separation with the above-described filter. After repeating the reslurry and the solid-liquid separation until the electric conductivity of the filtrate became 5.0 μS/cm or less, the solid-liquid separation was finally performed to obtain a toner cake. The obtained toner cake was dried and further classified using a classifier such that the volume-based median diameter was 7.0 μm, and thus a toner particle 1 was obtained.

Table 1 shows the formulation and the physical properties of the obtained toner particle.

TABLE 1

| | Resin particle (core) | | | | Resin particle (shell) | | | | | Aggregating agent | | | |
|---|---|---|---|---|---|---|---|---|---|---|---|---|---|
| | Resin particle dispersion liquid | Type | Tg (° C.) | Number of parts of addition (parts by mass) | Resin particle dispersion liquid | Type | Tg (° C.) | Number of parts of addition (parts by mass) | Number of parts of shell | Type | Number of parts of addition (parts by mass) | Polyvalent metal element Type | Polyvalent metal element Content (μmol/l) |
| Toner particle 1 | Resin particle dispersion liquid 1 | St/BA | 50 | 265 | Resin particle dispersion liquid 2 | St/BA | 59 | 15 | 5.7 | Aluminum chloride | 0.25 | Aluminum | 0.24 |
| Toner particle 2 | Resin particle dispersion liquid 1 | St/BA | 50 | 265 | Resin particle dispersion liquid 2 | St/BA | 59 | 15 | 5.7 | Aluminum chloride | 0.15 | Aluminum | 0.11 |
| Toner particle 3 | Resin particle dispersion liquid 1 | St/BA | 50 | 265 | Resin particle dispersion liquid 2 | St/BA | 59 | 15 | 5.7 | Aluminum chloride | 0.58 | Aluminum | 0.58 |

TABLE 1-continued

| | Resin particle (core) | | | | Resin particle (shell) | | | | | Aggregating agent | | Polyvalent metal element | |
|---|---|---|---|---|---|---|---|---|---|---|---|---|---|
| | Resin particle dispersion liquid | Type | Tg (° C.) | Number of parts of addition (parts by mass) | Resin particle dispersion liquid | Type | Tg (° C.) | Number of parts of addition (parts by mass) | Number of parts of shell | Type | Number of parts of addition (parts by mass) | Type | Content (μmol/l) |
| Toner particle 4 | Resin particle dispersion liquid 1 | St/BA | 50 | 265 | Resin particle dispersion liquid 2 | St/BA | 59 | 15 | 5.7 | Magnesium chloride | 0.22 | Magnesium | 0.44 |
| Toner particle 5 | Resin particle dispersion liquid 1 | St/BA | 50 | 265 | Resin particle dispersion liquid 2 | St/BA | 59 | 15 | 5.7 | Calcium chloride | 0.48 | Calcium | 0.41 |
| Toner particle 6 | Resin particle dispersion liquid 1 | St/BA | 50 | 265 | Resin particle dispersion liquid 2 | St/BA | 59 | 15 | 5.7 | Iron chloride(III) | 0.35 | Iron | 0.75 |
| Toner particle 7 | Resin particle dispersion liquid 1 | St/BA | 50 | 265 | Resin particle dispersion liquid 2 | St/BA | 59 | 15 | 5.7 | Aluminum chloride | 0.08 | Aluminum | 0.06 |

In the table, "the number of parts of the shell" is the number of parts by mass of the resin for the shell with respect to 100 parts by mass of the resin for the core particle.

Production Examples of Toner Particle 2 to 7

Each of toner particle 2 to 7 was obtained in the same manner as in the production example of the toner particle 1 except that the type and the addition amount of the aggregating agent was changed as shown in Table 1. Table 1 shows the physical properties of each of the obtained toner particle 2 to 7.

Preparation of Hydrotalcite Particle 1

A mixed aqueous solution of 1.03 mol/L of magnesium chloride and 0.239 mol/L of aluminum sulfate (A liquid), a 0.753 mol/L of sodium carbonate aqueous solution (B liquid), and 3.39 mol/L of sodium hydroxide aqueous solution (C liquid) was prepared.

Next, A liquid, B liquid, and C liquid were poured into the reaction tank at a flow rate that would give a volume ratio of 4.5:1 of A liquid: B liquid using a metering pump, a pH value of the reaction liquid was maintained in the range of 9.3 to 9.6 with C liquid, and the reaction temperature was 40° C. to form a precipitate. After filtration and washing, the precipitate was re-emulsified with ion-exchanged water to obtain a raw material hydrotalcite slurry. The concentration of the hydrotalcite in the obtained hydrotalcite slurry was 5.6% by mass.

The obtained hydrotalcite slurry was vacuum dried overnight at 40° C. NaF was dissolved in the ion-exchanged water to have a concentration of 100 mg/L, a solution adjusted to pH 7.0 using 1 mol/L of HCl or 1 mol/L of NaOH was prepared, and the dried hydrotalcite was added to the adjusted solution at a proportion of 0.1% (w/v %). Stirring was carried out at a constant speed for 48 hours using a magnetic stirrer to prevent sedimentation. Then, the hydrotalcite slurry was filtered through a membrane filter with a pore size of 0.5 μm and washed with the ion-exchanged water. The obtained hydrotalcite was vacuum dried overnight at 40° C. and then deagglomerated. Table 2 shows the composition and the physical properties of the obtained hydrotalcite particle 1.

Preparation of Hydrotalcite Particle 2 to 11

Hydrotalcite particle 2 to 11 were obtained in the same manner as in the production example of the hydrotalcite particle 1 except that A liquid: B liquid and the concentration of NaF aqueous solution were appropriately adjusted. Table 2 shows the compositions and the physical properties of the obtained hydrotalcite particle 2 to 11.

Preparation of Hydrotalcite Particle 12

Hydrotalcite particle 12 were obtained in the same manner as in the production example of the hydrotalcite particle 1 except that the ion-exchanged water was used instead of the NaF aqueous solution in the production example of the hydrotalcite particle 1. Table 2 shows the composition and the physical properties of the obtained hydrotalcite particle 12.

Preparation of Hydrotalcite Particle 13

Hydrotalcite particle 13 were obtained in the same manner as in the production example of the hydrotalcite particle 12 except that, before a slurry containing the obtained hydrotalcite was vacuum-dried at 40° C. overnight, 5 parts by mass of fluorosilicone oil was added to 95 parts by mass of solid content for surface treatment in the production example of the hydrotalcite particle 12. Table 2 shows the composition and the physical properties of the obtained hydrotalcite particle 13.

TABLE 2

| Hydrotalcite particle | Number average particle diameter H3 (nm) | Surface treatment | F/Al | Mg/Al |
|---|---|---|---|---|
| Hydrotalcite particle 1 | 400 | None | 0.12 | 2.16 |
| Hydrotalcite particle 2 | 400 | None | 0.04 | 2.11 |
| Hydrotalcite particle 3 | 400 | None | 0.02 | 2.11 |
| Hydrotalcite particle 4 | 400 | None | 0.01 | 2.11 |
| Hydrotalcite particle 5 | 400 | None | 0.60 | 2.14 |
| Hydrotalcite particle 6 | 400 | None | 0.65 | 2.14 |
| Hydrotalcite particle 7 | 400 | None | 0.32 | 2.11 |
| Hydrotalcite particle 8 | 60 | None | 0.12 | 3.00 |
| Hydrotalcite particle 9 | 50 | None | 0.12 | 3.00 |
| Hydrotalcite particle 10 | 800 | None | 0.12 | 2.11 |
| Hydrotalcite particle 11 | 1000 | None | 0.12 | 2.11 |

TABLE 2-continued

| Hydrotalcite particle | Number average particle diameter H3 (nm) | Surface treatment | F/Al | Mg/Al |
|---|---|---|---|---|
| Hydrotalcite particle 12 | 400 | None | 0.00 | 2.11 |
| Hydrotalcite particle 13 | 400 | Fluorosilicone oil 5% by mass | 0.00 | 2.16 |

Preparation of Fatty Acid Metal Salt Particle 1

A receiving container with a stirrer was provided and the stirrer was rotated at 300 rpm. 500 parts of a 0.5% by mass sodium stearate aqueous solution was put into the receiving container, and the liquid temperature was adjusted to 85° C. Next, 525 parts of a 0.2% by mass zinc sulfate aqueous solution was put dropwise into the receiving container for 15 minutes. After the total amount was put thereinto, the mixture was aged for 10 minutes at the reaction temperature, and the reaction was completed.

Next, the fatty acid metal salt slurry thus obtained was filtered and washed. The obtained washed fatty acid metal salt cake was coarsely pulverized and then dried at 100° C. using a continuous flash dryer. After that, the dried fatty acid metal salt cake was ground using a Nano Grinding Mill [NJ-300] (manufactured by Sunrex Co., Ltd.) at an air flow rate of 6.0 $m^3$/min and a processing speed of 80 kg/h, and then the particle was reslurried, and a fine particle and a coarse particle were removed using a wet centrifugal classifier. After that, it was dried at 80° C. using a continuous flash dryer to obtain fatty acid metal salt particle 1. Table 3 shows the physical properties of the fatty acid metal salt particle 1.

Preparation of Fatty Acid Metal Salt Particle 2 to 7

As shown in Table 3, fatty acid metal salt particle 2 to 7 were obtained in the same manner as in the production example of the fatty acid metal salt particle 1, except that the materials were changed and the number average particle diameter was adjusted to be as shown in Table 3. Table 3 shows the physical properties of the fatty acid metal salt particle 2 to 7.

TABLE 3

| Fatty acid metal salt particle | Number average particle diameter S3 (nm) | Material | Surface treatment |
|---|---|---|---|
| Fatty acid metal salt particle 1 | 450 nm | Zinc stearate | None |
| Fatty acid metal salt particle 2 | 1000 nm | Zinc stearate | None |
| Fatty acid metal salt particle 3 | 620 nm | Zinc laurate | None |
| Fatty acid metal salt particle 4 | 430 nm | Lithium stearate | None |
| Fatty acid metal salt particle 5 | 500 nm | Magnesium stearate | None |
| Fatty acid metal salt particle 6 | 580 nm | Calcium stearate | None |
| Fatty acid metal salt particle 7 | 500 nm | Barium stearate | None |

Production Example of Toner 1

The hydrotalcite particle 1 (0.2 parts), the fatty acid metal salt particle 1 (0.1 parts), and silica particle 1 (RX200: primary average particle diameter 12 nm, HMDS treatment, manufactured by Nippon Aerosil Co., Ltd.) (1.5 parts) were externally mixed with the toner particle 1 (98.4 parts) obtained above using FM10C (manufactured by Nippon Coke Kogyo Co., Ltd.). As the external addition conditions, A0 blade was used as the lower blade, the distance from the deflector wall was set to 20 mm, and the external addition was performed in the state of the amount of the toner particle charged: 2.0 kg, the rotation speed: 66.6 $s^{-1}$, the external addition time: 10 minutes, and cooling water at a temperature of 20° C. and a flow rate of 10 L/min.

Thereafter, a toner 1 was obtained by sieving with a mesh having an opening of 200 μm. Tables 4, 5-1 and 5-2 show the physical properties of the obtained toner 1.

TABLE 4

| | Toner particle | | Silica fine particle | Hydrotalcite particle | | | | Fatty acid metal salt particle | | | |
|---|---|---|---|---|---|---|---|---|---|---|---|
| | Toner particle No. | Addition amount (parts by mass) | Addition amount (parts by mass) | H Particle No. | Addition amount (parts by mass) | Content (% by mass) | H3 (nm) | S Particle No. | Addition amount (parts by mass) | Content (% by mass) | S3 (nm) |
| Toner 1 | Toner particle 1 | 98.40 | 1.3 | H-1 | 0.20 | 0.20 | 400 | S-1 | 0.10 | 0.10 | 450 |
| Toner 2 | Toner particle 1 | 98.30 | 1.3 | H-1 | 0.20 | 0.20 | 400 | S-1 | 0.20 | 0.20 | 450 |
| Toner 3 | Toner particle 1 | 98.35 | 1.3 | H-1 | 0.30 | 0.30 | 400 | S-1 | 0.05 | 0.05 | 450 |
| Toner 4 | Toner particle 1 | 98.35 | 1.3 | H-1 | 0.05 | 0.05 | 400 | S-1 | 0.30 | 0.30 | 450 |
| Toner 5 | Toner particle 1 | 98.40 | 1.3 | H-2 | 0.20 | 0.20 | 400 | S-1 | 0.10 | 0.10 | 450 |
| Toner 6 | Toner particle 1 | 98.40 | 1.3 | H-3 | 0.20 | 0.20 | 400 | S-1 | 0.10 | 0.10 | 450 |
| Toner 7 | Toner particle 1 | 98.40 | 1.3 | H-4 | 0.20 | 0.20 | 400 | S-1 | 0.10 | 0.10 | 450 |
| Toner 8 | Toner particle 1 | 98.30 | 1.3 | H-3 | 0.20 | 0.20 | 400 | S-1 | 0.20 | 0.20 | 450 |
| Toner 9 | Toner particle 1 | 98.30 | 1.3 | H-4 | 0.20 | 0.20 | 400 | S-1 | 0.20 | 0.20 | 450 |
| Toner 10 | Toner particle 1 | 98.35 | 1.3 | H-5 | 0.20 | 0.20 | 400 | S-1 | 0.15 | 0.15 | 450 |
| Toner 11 | Toner particle 1 | 98.45 | 1.3 | H-5 | 0.10 | 0.10 | 400 | S-1 | 0.15 | 0.15 | 450 |
| Toner 12 | Toner particle 1 | 98.45 | 1.3 | H-6 | 0.10 | 0.10 | 400 | S-1 | 0.15 | 0.15 | 450 |
| Toner 13 | Toner particle 1 | 98.45 | 1.3 | H-7 | 0.10 | 0.10 | 400 | S-1 | 0.15 | 0.15 | 450 |
| Toner 14 | Toner particle 1 | 98.20 | 1.3 | H-2 | 0.20 | 0.20 | 400 | S-1 | 0.30 | 0.30 | 450 |
| Toner 15 | Toner particle 1 | 98.40 | 1.3 | H-2 | 0.10 | 0.10 | 400 | S-1 | 0.20 | 0.20 | 450 |
| Toner 16 | Toner particle 1 | 98.45 | 1.3 | H-2 | 0.05 | 0.05 | 400 | S-1 | 0.20 | 0.20 | 450 |
| Toner 17 | Toner particle 1 | 98.50 | 1.3 | H-2 | 0.10 | 0.10 | 400 | S-1 | 0.10 | 0.10 | 450 |
| Toner 18 | Toner particle 1 | 98.50 | 1.3 | H-3 | 0.10 | 0.10 | 400 | S-1 | 0.10 | 0.10 | 450 |
| Toner 19 | Toner particle 1 | 98.50 | 1.3 | H-4 | 0.10 | 0.10 | 400 | S-1 | 0.10 | 0.10 | 450 |
| Toner 20 | Toner particle 1 | 98.45 | 1.3 | H-2 | 0.20 | 0.20 | 400 | S-1 | 0.05 | 0.05 | 450 |
| Toner 21 | Toner particle 1 | 98.45 | 1.3 | H-3 | 0.20 | 0.20 | 400 | S-1 | 0.05 | 0.05 | 450 |
| Toner 22 | Toner particle 1 | 98.45 | 1.3 | H-4 | 0.20 | 0.20 | 400 | S-1 | 0.05 | 0.05 | 450 |
| Toner 23 | Toner particle 1 | 98.40 | 1.3 | H-8 | 0.20 | 0.20 | 60 | S-1 | 0.10 | 0.10 | 450 |
| Toner 24 | Toner particle 1 | 98.40 | 1.3 | H-9 | 0.20 | 0.20 | 50 | S-1 | 0.10 | 0.10 | 450 |

TABLE 4-continued

| | Toner particle | | Silica fine particle | Hydrotalcite particle | | | | Fatty acid metal salt particle | | | |
|---|---|---|---|---|---|---|---|---|---|---|---|
| | Toner particle No. | Addition amount (parts by mass) | Addition amount (parts by mass) | H Particle No. | Addition amount (parts by mass) | Content (% by mass) | H3 (nm) | S Particle No. | Addition amount (parts by mass) | Content (% by mass) | S3 (nm) |
| Toner 25 | Toner particle 1 | 98.40 | 1.3 | H-10 | 0.20 | 0.20 | 800 | S-1 | 0.10 | 0.10 | 450 |
| Toner 26 | Toner particle 1 | 98.40 | 1.3 | H-11 | 0.20 | 0.20 | 1000 | S-1 | 0.10 | 0.10 | 450 |
| Toner 27 | Toner particle 1 | 98.40 | 1.3 | H-10 | 0.20 | 0.20 | 800 | S-2 | 0.10 | 0.10 | 1000 |
| Toner 28 | Toner particle 2 | 98.40 | 1.3 | H-1 | 0.20 | 0.20 | 400 | S-1 | 0.10 | 0.10 | 450 |
| Toner 29 | Toner particle 3 | 98.40 | 1.3 | H-1 | 0.20 | 0.20 | 400 | S-1 | 0.10 | 0.10 | 450 |
| Toner 30 | Toner particle 4 | 98.40 | 1.3 | H-1 | 0.20 | 0.20 | 400 | S-1 | 0.10 | 0.10 | 450 |
| Toner 31 | Toner particle 5 | 98.40 | 1.3 | H-1 | 0.20 | 0.20 | 400 | S-1 | 0.10 | 0.10 | 450 |
| Toner 32 | Toner particle 6 | 98.40 | 1.3 | H-1 | 0.20 | 0.20 | 400 | S-1 | 0.10 | 0.10 | 450 |
| Toner 33 | Toner particle 7 | 98.40 | 1.3 | H-1 | 0.20 | 0.20 | 400 | S-1 | 0.10 | 0.10 | 450 |
| Toner 34 | Toner particle 1 | 98.40 | 1.3 | H-1 | 0.20 | 0.20 | 400 | S-3 | 0.10 | 0.10 | 620 |
| Toner 35 | Toner particle 1 | 98.40 | 1.3 | H-1 | 0.20 | 0.20 | 400 | S-4 | 0.10 | 0.10 | 430 |
| Toner 36 | Toner particle 1 | 98.40 | 1.3 | H-1 | 0.20 | 0.20 | 400 | S-5 | 0.10 | 0.10 | 500 |
| Toner 37 | Toner particle 1 | 98.40 | 1.3 | H-1 | 0.20 | 0.20 | 400 | S-6 | 0.10 | 0.10 | 580 |
| Toner 38 | Toner particle 1 | 98.40 | 1.3 | H-1 | 0.20 | 0.20 | 400 | S-7 | 0.10 | 0.10 | 500 |
| Toner 39 | Toner particle 1 | 98.40 | 1.3 | H-12 | 0.20 | 0.20 | 400 | S-1 | 0.10 | 0.10 | 450 |
| Toner 40 | Toner particle 1 | 98.40 | 1.3 | H-13 | 0.20 | 0.20 | 400 | S-1 | 0.10 | 0.10 | 450 |
| Toner 41 | Toner particle 1 | 98.37 | 1.3 | H-1 | 0.30 | 0.30 | 400 | S-1 | 0.03 | 0.03 | 450 |
| Toner 42 | Toner particle 1 | 98.25 | 1.3 | H-1 | 0.40 | 0.40 | 400 | S-1 | 0.05 | 0.05 | 450 |
| Toner 43 | Toner particle 1 | 98.29 | 1.3 | H-1 | 0.05 | 0.05 | 400 | S-1 | 0.36 | 0.36 | 450 |
| Toner 44 | Toner particle 1 | 98.36 | 1.3 | H-1 | 0.04 | 0.04 | 400 | S-1 | 0.30 | 0.30 | 450 |
| Toner 45 | Toner particle 1 | 97.80 | 1.3 | H-1 | 0.80 | 0.80 | 400 | S-1 | 0.10 | 0.10 | 450 |
| Toner 46 | Toner particle 1 | 98.37 | 1.3 | H-3 | 0.30 | 0.30 | 400 | S-1 | 0.03 | 0.03 | 450 |
| Toner 47 | Toner particle 1 | 98.29 | 1.3 | H-5 | 0.05 | 0.05 | 400 | S-1 | 0.36 | 0.36 | 450 |
| Toner 48 | Toner particle 1 | 98.35 | 1.3 | H-2 | 0.30 | 0.30 | 400 | S-1 | 0.05 | 0.05 | 450 |
| Toner 49 | Toner particle 1 | 98.35 | 1.3 | H-7 | 0.05 | 0.05 | 400 | S-2 | 0.30 | 0.30 | 1000 |

In Table 4, the H particle indicate the hydrotalcite particle, the S particle indicate the fatty acid metal salt particle, H-1 to H-13 indicate the hydrotalcite particle 1 to 13, S-1 to S-7 indicate the fatty acid metal salt particle 1 to 7, H3 indicates the number average particle diameter of the primary particle of the hydrotalcite particle, and S3 indicates the number average particle diameter of the primary particle of the fatty acid metal salt particle.

TABLE 5-1

| | Physical properties relating to hydrotalcite particle | | | | | | Physical properties relating to fatty acid metal salt particle | | | | |
|---|---|---|---|---|---|---|---|---|---|---|---|
| | F atomic % (atm %) | * | F/Al | H1 (%) | H2 | H3 (nm) | Metal element | Metal atomic % (atm %) | S1 (%) | S2 | S3 (nm) |
| Toner 1 | 0.45 | Presence | 0.12 | 0.27 | 12.15 | 400 | Zn | 0.42 | 0.20 | 8.40 | 450 |
| Toner 2 | 0.45 | Presence | 0.12 | 0.27 | 12.15 | 400 | Zn | 0.42 | 0.40 | 16.80 | 450 |
| Toner 3 | 0.45 | Presence | 0.12 | 0.41 | 18.45 | 400 | Zn | 0.42 | 0.10 | 4.20 | 450 |
| Toner 4 | 0.45 | Presence | 0.12 | 0.07 | 3.15 | 400 | Zn | 0.42 | 0.60 | 25.20 | 450 |
| Toner 5 | 0.15 | Presence | 0.04 | 0.27 | 4.05 | 400 | Zn | 0.42 | 0.20 | 8.40 | 450 |
| Toner 6 | 0.08 | Presence | 0.02 | 0.27 | 2.16 | 400 | Zn | 0.42 | 0.20 | 8.40 | 450 |
| Toner 7 | 0.04 | Presence | 0.01 | 0.27 | 1.08 | 400 | Zn | 0.42 | 0.20 | 8.40 | 450 |
| Toner 8 | 0.08 | Presence | 0.02 | 0.27 | 2.16 | 400 | Zn | 0.42 | 0.40 | 16.80 | 450 |
| Toner 9 | 0.04 | Presence | 0.01 | 0.27 | 1.08 | 400 | Zn | 0.42 | 0.40 | 16.80 | 450 |
| Toner 10 | 2.41 | Presence | 0.60 | 0.27 | 65.07 | 400 | Zn | 0.42 | 0.30 | 12.60 | 450 |
| Toner 11 | 2.41 | Presence | 0.60 | 0.14 | 33.74 | 400 | Zn | 0.42 | 0.30 | 12.60 | 450 |
| Toner 12 | 2.60 | Presence | 0.65 | 0.14 | 36.40 | 400 | Zn | 0.42 | 0.30 | 12.60 | 450 |
| Toner 13 | 1.19 | Presence | 0.32 | 0.14 | 16.66 | 400 | Zn | 0.42 | 0.30 | 12.60 | 450 |
| Toner 14 | 0.15 | Presence | 0.04 | 0.27 | 4.05 | 400 | Zn | 0.42 | 0.60 | 25.20 | 450 |
| Toner 15 | 0.15 | Presence | 0.04 | 0.14 | 2.10 | 400 | Zn | 0.42 | 0.40 | 16.80 | 450 |
| Toner 16 | 0.15 | Presence | 0.04 | 0.07 | 1.05 | 400 | Zn | 0.42 | 0.40 | 16.80 | 450 |
| Toner 17 | 0.15 | Presence | 0.04 | 0.14 | 2.10 | 400 | Zn | 0.42 | 0.20 | 8.40 | 450 |
| Toner 18 | 0.08 | Presence | 0.02 | 0.14 | 1.12 | 400 | Zn | 0.42 | 0.20 | 8.40 | 450 |
| Toner 19 | 0.04 | Presence | 0.01 | 0.14 | 0.56 | 400 | Zn | 0.42 | 0.20 | 8.40 | 450 |
| Toner 20 | 0.15 | Presence | 0.04 | 0.27 | 4.05 | 400 | Zn | 0.42 | 0.10 | 4.20 | 450 |
| Toner 21 | 0.08 | Presence | 0.02 | 0.27 | 2.16 | 400 | Zn | 0.42 | 0.10 | 4.20 | 450 |
| Toner 22 | 0.04 | Presence | 0.01 | 0.27 | 1.08 | 400 | Zn | 0.42 | 0.10 | 4.20 | 450 |
| Toner 23 | 0.45 | Presence | 0.12 | 0.32 | 14.40 | 60 | Zn | 0.42 | 0.20 | 8.40 | 450 |
| Toner 24 | 0.45 | Presence | 0.12 | 0.33 | 14.85 | 50 | Zn | 0.42 | 0.20 | 8.40 | 450 |
| Toner 25 | 0.45 | Presence | 0.12 | 0.24 | 10.80 | 800 | Zn | 0.42 | 0.20 | 8.40 | 450 |
| Toner 26 | 0.45 | Presence | 0.12 | 0.22 | 9.90 | 1000 | Zn | 0.42 | 0.20 | 8.40 | 450 |
| Toner 27 | 0.45 | Presence | 0.12 | 0.24 | 10.80 | 800 | Zn | 0.42 | 0.12 | 5.04 | 1000 |
| Toner 28 | 0.45 | Presence | 0.12 | 0.27 | 12.15 | 400 | Zn | 0.42 | 0.20 | 8.40 | 450 |
| Toner 29 | 0.45 | Presence | 0.12 | 0.27 | 12.15 | 400 | Zn | 0.42 | 0.20 | 8.40 | 450 |
| Toner 30 | 0.45 | Presence | 0.12 | 0.27 | 12.15 | 400 | Zn | 0.42 | 0.20 | 8.40 | 450 |

TABLE 5-1-continued

| | Physical properties relating to hydrotalcite particle | | | | | | Physical properties relating to fatty acid metal salt particle | | | | |
|---|---|---|---|---|---|---|---|---|---|---|---|
| | F atomic % (atm %) | * | F/Al | H1 (%) | H2 | H3 (nm) | Metal element | Metal atomic % (atm %) | S1 (%) | S2 | S3 (nm) |
| Toner 31 | 0.45 | Presence | 0.12 | 0.27 | 12.15 | 400 | Zn | 0.42 | 0.20 | 8.40 | 450 |
| Toner 32 | 0.45 | Presence | 0.12 | 0.27 | 12.15 | 400 | Zn | 0.42 | 0.20 | 8.40 | 450 |
| Toner 33 | 0.45 | Presence | 0.12 | 0.27 | 12.15 | 400 | Zn | 0.42 | 0.20 | 8.40 | 450 |
| Toner 34 | 0.45 | Presence | 0.12 | 0.27 | 12.15 | 400 | Zn | 0.42 | 0.20 | 8.40 | 620 |
| Toner 35 | 0.45 | Presence | 0.12 | 0.27 | 12.15 | 400 | Li | 0.40 | 0.20 | 8.00 | 430 |
| Toner 36 | 0.45 | Presence | 0.12 | 0.27 | 12.15 | 400 | Mg | 0.41 | 0.20 | 8.20 | 500 |
| Toner 37 | 0.45 | Presence | 0.12 | 0.27 | 12.15 | 400 | Ca | 0.43 | 0.20 | 8.60 | 580 |
| Toner 38 | 0.45 | Presence | 0.12 | 0.27 | 12.15 | 400 | Ba | 0.40 | 0.20 | 8.00 | 500 |
| Toner 39 | 0.00 | Absence | 0.00 | 0.27 | 0.00 | 400 | Zn | 0.42 | 0.20 | 8.40 | 450 |
| Toner 40 | 0.03 | Absence | 0.00 | 0.27 | 0.81 | 400 | Zn | 0.42 | 0.20 | 8.40 | 450 |
| Toner 41 | 0.45 | Presence | 0.12 | 0.41 | 18.45 | 400 | Zn | 0.42 | 0.06 | 2.52 | 450 |
| Toner 42 | 0.45 | Presence | 0.12 | 0.54 | 24.30 | 400 | Zn | 0.42 | 0.10 | 4.20 | 450 |
| Toner 43 | 0.45 | Presence | 0.12 | 0.07 | 3.15 | 400 | Zn | 0.42 | 0.72 | 30.24 | 450 |
| Toner 44 | 0.45 | Presence | 0.12 | 0.05 | 2.25 | 400 | Zn | 0.42 | 0.60 | 25.20 | 450 |
| Toner 45 | 0.45 | Presence | 0.12 | 1.08 | 48.60 | 400 | Zn | 0.42 | 0.20 | 8.40 | 450 |
| Toner 46 | 0.04 | Presence | 0.01 | 0.27 | 1.08 | 400 | Zn | 0.42 | 0.06 | 2.52 | 450 |
| Toner 47 | 2.41 | Presence | 0.60 | 0.07 | 16.87 | 400 | Zn | 0.42 | 0.72 | 30.24 | 450 |
| Toner 48 | 0.15 | Presence | 0.04 | 0.49 | 7.35 | 400 | Zn | 0.42 | 0.10 | 4.20 | 450 |
| Toner 49 | 1.19 | Presence | 0.32 | 0.07 | 8.33 | 400 | Zn | 0.42 | 0.71 | 29.82 | 1000 |

TABLE 5-2

| | | | | Physical properties relating to toner particle | |
|---|---|---|---|---|---|
| | S1/H1 | S2/H2 | S3 > H3 | Polyvalent metal element | Content |
| Toner 1 | 0.74 | 0.69 | Satisfy | Al | 0.03 |
| Toner 2 | 1.48 | 1.38 | Satisfy | Al | 0.03 |
| Toner 3 | 0.24 | 0.23 | Satisfy | Al | 0.03 |
| Toner 4 | 8.57 | 8.00 | Satisfy | Al | 0.03 |
| Toner 5 | 0.74 | 2.07 | Satisfy | Al | 0.03 |
| Toner 6 | 0.74 | 3.89 | Satisfy | Al | 0.03 |
| Toner 7 | 0.74 | 7.78 | Satisfy | Al | 0.03 |
| Toner 8 | 1.48 | 7.78 | Satisfy | Al | 0.03 |
| Toner 9 | 1.48 | 15.56 | Satisfy | Al | 0.03 |
| Toner 10 | 1.11 | 0.19 | Satisfy | Al | 0.03 |
| Toner 11 | 2.14 | 0.37 | Satisfy | Al | 0.03 |
| Toner 12 | 2.14 | 0.35 | Satisfy | Al | 0.03 |
| Toner 13 | 2.14 | 0.76 | Satisfy | Al | 0.03 |
| Toner 14 | 2.22 | 6.22 | Satisfy | Al | 0.03 |
| Toner 15 | 2.86 | 8.00 | Satisfy | Al | 0.03 |
| Toner 16 | 5.71 | 16.00 | Satisfy | Al | 0.03 |
| Toner 17 | 1.43 | 4.00 | Satisfy | Al | 0.03 |
| Toner 18 | 1.43 | 7.50 | Satisfy | Al | 0.03 |
| Toner 19 | 1.43 | 15.00 | Satisfy | Al | 0.03 |
| Toner 20 | 0.37 | 1.04 | Satisfy | Al | 0.03 |
| Toner 21 | 0.37 | 1.94 | Satisfy | Al | 0.03 |
| Toner 22 | 0.37 | 3.89 | Satisfy | Al | 0.03 |
| Toner 23 | 0.63 | 0.58 | Satisfy | Al | 0.03 |
| Toner 24 | 0.61 | 0.57 | Satisfy | A | 0.03 |
| Toner 25 | 0.83 | 0.78 | Not satisfy | Al | 0.03 |
| Toner 26 | 0.91 | 0.85 | Not satisfy | Al | 0.03 |
| Toner 27 | 0.50 | 0.47 | Satisfy | Al | 0.03 |
| Toner 28 | 0.74 | 0.69 | Satisfy | Al | 0.01 |
| Toner 29 | 0.74 | 0.69 | Satisfy | Al | 0.07 |
| Toner 30 | 0.74 | 0.69 | Satisfy | Mg | 0.06 |
| Toner 31 | 0.74 | 0.69 | Satisfy | Ca | 0.05 |
| Toner 32 | 0.74 | 0.69 | Satisfy | Fe | 0.09 |
| Toner 33 | 0.74 | 0.69 | Satisfy | — | — |
| Toner 34 | 0.74 | 0.69 | Satisfy | Al | 0.03 |
| Toner 35 | 0.74 | 0.66 | Satisfy | Al | 0.03 |
| Toner 36 | 0.74 | 0.67 | Satisfy | Al | 0.03 |
| Toner 37 | 0.74 | 0.71 | Satisfy | Al | 0.03 |
| Toner 38 | 0.74 | 0.66 | Satisfy | Al | 0.03 |
| Toner 39 | 0.74 | — | Satisfy | Al | 0.03 |
| Toner 40 | 0.74 | 10.37 | Satisfy | Al | 0.03 |
| Toner 41 | 0.15 | 0.14 | Satisfy | Al | 0.03 |
| Toner 42 | 0.19 | 0.17 | Satisfy | Al | 0.03 |
| Toner 43 | 10.29 | 9.60 | Satisfy | Al | 0.03 |

TABLE 5-2-continued

| | | | | Physical properties relating to toner particle | |
|---|---|---|---|---|---|
| | S1/H1 | S2/H2 | S3 > H3 | Polyvalent metal element | Content |
| Toner 44 | 12.00 | 11.20 | Satisfy | Al | 0.03 |
| Toner 45 | 0.19 | 0.17 | Satisfy | Al | 0.03 |
| Toner 46 | 0.22 | 2.33 | Satisfy | Al | 0.03 |
| Toner 47 | 10.29 | 1.79 | Satisfy | Al | 0.03 |
| Toner 48 | 0.20 | 0.57 | Satisfy | Al | 0.03 |
| Toner 49 | 10.14 | 3.58 | Satisfy | Al | 0.03 |

In Tables 5-1 and 5-2, * indicates determination whether or not fluorine atoms are contained inside the hydrotalcite particle, and "Presence" and "Absence" indicate that the fluorine atoms are contained inside the hydrotalcite particle and the fluorine atoms are not contained inside the hydrotalcite particle. Further, H1 indicates the area ratio of the hydrotalcite particle to the toner particle, H2 indicates the product of F atomic %, H1, and 100, H3 indicates the number average particle diameter of the primary particle of the hydrotalcite particle, S1 indicates the area ratio of the fatty acid metal salt particle to the toner particle, S2 indicates the product of metal atomic %, S1, and 100, S3 indicates the number average particle diameter of the primary particle of the fatty acid metal salt particle, and the content indicates a content of the polyvalent metal element in the toner particle (an elemental ratio of the polyvalent metal element to carbon).

Production Examples of Toners 2 to 49

Toners 2 to 49 were obtained in the same manner as in the production example of the toner 1 except that the toner particle, the hydrotalcite particle, and the fatty acid metal salt particle used in the production example of the toner 1, and the addition amounts of these were changed as shown in Table 4. Tables 4, 5-1 and 5-2 show the physical properties of the obtained toners 2 to 49.

Image Evaluation

The image evaluation was performed using a commercially available color laser printer (HP LaserJet Enterprise Color M611dn, manufactured by HP) partially modified. Specifically, modification was made to work even if only one color process cartridge is installed, and the transfer current could be changed to a desired value. The toner was taken out from the cyan cartridge, and 325 g of the toner to be evaluated was filled instead. A cyan cartridge filled with the toner to be evaluated was installed to a main body, and the evaluation was performed without installation of any cartridges other than the cyan cartridge. The following evaluations 1 to 6 were carried out for the evaluation.

Evaluation 1: Evaluation of Cleaning Property in Low Temperature and Low Humidity Environment After the main body and the cartridge filled with the toner were left in a low temperature and low humidity environment (temperature 15° C., humidity 5% RH) for one day, under the above environment, the transfer current was increased by 20% from the normal setting, and a horizontal line image with a printing rate of 1% was output by 40,000 sheets in an intermittent mode. After the output, the transfer current was returned to the normal setting, and then a halftone image with a printing rate of 23% was output by three sheets (a halftone image 1).

Copykid copy paper (manufactured by UPM, A4 size 210×297 mm, basis weight 70 g/m$^2$) was used as the evaluation paper.

Since the Copy kid copy paper is paper that generates a large amount of paper dust, in a case where it used in a low temperature and low humidity environment or in a case where it is used under high transfer current conditions, particularly the paper dust becomes negative to easily migrate to the photoreceptor, and thus this evaluation using such paper is an evaluation under severe conditions with respect to the cleaning property of the paper dust.

In this evaluation, in a case where the toner has a poor cleaning property, the paper dust, the external additives, and the toner that have slipped through in the cleaning step will contaminate an electrification roller, and the electrification ability of the contaminated portion will decrease, and thus, in a case where the halftone image is output, a black vertical streak occurs.

Therefore, the number of vertical streaks was counted for three halftone images obtained after outputting 40,000 sheets, and the cleaning property in a low temperature and low humidity environment was evaluated according to the following criteria. C or more was determined to be good.

Evaluation Criteria

A. The width of the streak is less than 0.5 mm, and the number of streaks is 3 or less.

B. The width of the streak is less than 0.5 mm, and the number of streaks is from 4 to 6.

C. The width of the streak is less than 0.5 mm, and the number of streaks is from 7 to 9.

D. The width of the streak is less than 0.5 mm, and the number of streaks is 10 or more.

Alternatively, streaks of 0.5 mm or more occur.

Evaluation 2: Evaluation of Fog After Long-term Durable Use in Low Temperature and Low Humidity Environment After the main body and the cartridge filled with the toner were left in a low temperature and low humidity environment (temperature 15° C., humidity 5% RH) for one day, under the above environment, a horizontal line image with a printing rate of 1% was output by 40,000 sheets in an intermittent mode, and then an all-white image masked by sticking a sticky note on a part of the paper was output by three sheets.

Copykid copy paper (manufactured by UPM, A4 size 210×297 mm, basis weight 70 g/m$^2$) that easily generates paper dust was used as the evaluation paper.

After the sticky note was removed, the reflectance (%) was measured at 5 points for each of a portion with the sticky note and a portion without the sticky note, and average values thereof are obtained. After that, a difference between the average values was obtained and was taken as fog after long-term durable use in a low temperature and low humidity environment.

The reflectance was measured using a digital white photometer (Type TC-6D manufactured by Tokyo Denshoku Co., Ltd. using a green filter). The evaluation criteria are as follows, and the lower the value, the better. C or more was determined to be good.

Evaluation Criteria

A. The fog is less than 0.5%.

B. The fog is 0.5% or more and less than 1.0%.

C. The fog is 1.0% or more and less than 1.5%.

D. The fog is 1.5% or more.

Evaluation 3: Printing Rate Stability of Cleaning in Low Temperature and Low Humidity Environment After the main body and the cartridge filled with the toner were left in a low temperature and low humidity environment (temperature 15° C., humidity 5% RH) for one day, under the above environment, an image in which a horizontal line with a printing rate of 1% is disposed in a left half and a solid black image is disposed in a right half was output by 5,000 sheets in an intermittent mode, and then a halftone image (a printing rate 23%) was output by three sheets.

Copykid copy paper (manufactured by UPM, A4 size 210×297 mm, basis weight 70 g/m$^2$) that generates a large amount of paper dust was used as the evaluation paper.

In a case where there is a difference in the cleaning property depending on the printing rate of the output image, a difference in the level of contamination of the electrification roller occurs, and a difference in the electrification amount applied to the photoreceptor occurs. In the above evaluation, a difference in the halftone density between the left side and the right side appears.

Regarding the three sheets of halftone images obtained (a printing rate 23%), from the difference in the halftone density between the left side (a region evaluated for durability with an image having a low printing rate) and the right side (a region evaluated for durability with an image having a high printing rate), the printing rate stability of cleaning was evaluated.

The halftone image density on the left side of each image was measured at 10 points and the average value was taken (a left halftone density), and similarly the halftone image density on the right side of each image was measured at 10 points and the average value was taken (a right halftone density).

After that, the smaller the density difference between the left side halftone density and the right side halftone density, the better the printing rate stability of cleaning, and the evaluation criteria are as follows. C or more was determined to be good.

Evaluation Criteria

A. The halftone density difference is less than 0.04.

B. The halftone density difference is 0.04 or more and less than 0.07.

C. The halftone density difference is 0.07 or more and less than 0.10.

D. The halftone density difference after long-term durable use is 0.10 or more.

Evaluation 4: Halftone Reproducibility in Low Temperature and Low Humidity Environment After the main body and the cartridge filled with the toner were left in a low temperature and low humidity environment (temperature 15° C., humidity 5% RH) for one day, under the above environment, a horizontal line image with a printing rate of 4% was output by 5,000 sheets in an intermittent mode, and then a halftone image with a printing rate 23% was output. After the halftone image was observed using a microscope, the cross-sectional areas of the dots were binarized through image analysis, the average value and standard deviation of the cross-sectional areas were obtained, and a value obtained by dividing the standard deviation by the average value and multiplying by 100 was defined as CV %. The halftone reproducibility was evaluated from the value of CV % on the basis of the following criteria.

The sharper the electrification distribution of the toner, the better the halftone reproducibility.

Evaluation Criteria

A: CV % is less than 10%.

B: CV % is 10% or more and less than 15%.

C: CV % is 15% or more and less than 20%.

D: CV % is 20% or more.

Evaluation 5: Evaluation of Cleaning Property in Extremely Low Temperature and Low Humidity Environment After the main body and the cartridge filled with the toner were left in an extremely low temperature and low humidity environment (temperature 0° C., humidity 5% RH) for one day, under the above environment, a horizontal line image with a printing rate of 10% was output by 5,000 sheets in an intermittent mode. After the output, a halftone image with a printing rate of 23% was output by three sheets (a halftone image 1).

Copykid copy paper (manufactured by UPM, A4 size 210×297 mm, basis weight 70 $g/m^2$) was used as the evaluation paper.

Since the Copy kid copy paper is paper that generates a large amount of paper dust, this evaluation using such paper is an evaluation under severe conditions with respect to the cleaning property of the paper dust.

In addition, in the extremely low temperature and low humidity environment, the cleaning member becomes hard and the formation of a nip becomes severe, and thus the toner easily slips through. Therefore, as the evaluation for durability is performed with an image with a higher printing rate, the evaluation of the cleaning property becomes more severe. In this evaluation, in a case where the toner has a poor cleaning property, the paper dust, the external additives, and the toner that have slipped through in the cleaning step will contaminate an electrification roller, and the electrification ability of the contaminated portion will decrease, and thus, in a case where the halftone image is output, a black vertical streak occurs.

Therefore, the number of vertical streaks was counted for three halftone images obtained after long-term durable use, and the cleaning property in an extremely low temperature and low humidity environment was evaluated according to the following criteria. C or more was determined to be good.

Evaluation Criteria

A. The width of the streak is less than 0.5 mm, and the number of streaks is 3 or less.

B. The width of the streak is less than 0.5 mm, and the number of streaks is from 4 to 6.

C. The width of the streak is less than 0.5 mm, and the number of streaks is from 7 to 9 or less.

D. The width of the streak is less than 0.5 mm, and the number of streaks is 10 or more. Alternatively, streaks of 0.5 mm or more occur.

Evaluation 6: Electrification Rising Property in Low Temperature and Low Humidity Environment After the main body and the cartridge filled with the toner were left in a low temperature and low humidity environment (temperature 15° C., humidity 5% RH) for one day, under the above environment, a horizontal line image with a printing rate of 1% was output by 40,000 sheets in an intermittent mode.

After that, a halftone image in which a solid black patch of 20 mm×20 mm and a solid white patch of 20 mm×20 mm were alternately disposed at a leading edge margin of 5 mm and then a halftone image was disposed on the entire surface was output (a halftone image 2).

In the above image, the halftone densities at a position (a photosensitive drum pitch of about 75.4 mm) where the images of the solid black patch and the solid white patch were output when a photosensitive drum was used for a second week were defined as a halftone density after solid black and a halftone density after solid white, and the electrification rising property was evaluated from a difference between the halftone density after solid black and the halftone density after solid white.

A halftone image after solid white was formed with a toner that has been rubbed many times with a developing blade or a developing roller to increase the electrification amount, while a halftone image after solid black was formed immediately after being electrified at once by the developing blade or the developing roller.

Therefore, in the case of a toner having a poor electrification rising property, it appears as a density difference between the halftone density after solid black and the halftone density after solid white.

Since the electrification rising property easily deteriorates in a low temperature and low humidity environment or after long-term durable use, this evaluation is a severe evaluation of the electrification rising property.

Specifically, for the halftone image 2, the density of the halftone image after solid black was measured at 10 points at positions from 99 mm to 119 mm from the leading edge of the paper, and an average value was obtained as the halftone density after solid black. Similarly, the density of the halftone image after solid white was measured at 10 points, and an average value was obtained as the halftone density after solid white. The evaluation criteria are as follows. C or more was determined to be good.

Evaluation Criteria

A. The halftone density difference after long-term durable use is less than 0.05.

B. The halftone density difference after long-term durable use is 0.05 or more and less than 0.10.

C. The halftone density difference after long-term durable use is 0.10 or more and less than 0.15.

D. The halftone density difference after long-term durable use is 0.15 or more.

TABLE 6

| | | Evaluation 1 | | Evaluation 2 | | Evaluation 3 | | Evaluation 4 | | Evaluation 5 | | Evaluation 6 | |
|---|---|---|---|---|---|---|---|---|---|---|---|---|---|
| Example 1 | Toner 1 | A | 0 | A | 0.1 | A | 0.01 | A | 1 | A | 0 | A | 0.00 |
| Example 2 | Toner 2 | A | 0 | A | 0.1 | A | 0.01 | A | 1 | A | 0 | A | 0.01 |
| Example 3 | Toner 3 | C | 7 | A | 0.1 | B | 0.04 | A | 5 | B | 4 | A | 0.01 |
| Example 4 | Toner 4 | C | 7 | A | 0.1 | B | 0.04 | A | 6 | B | 4 | A | 0.01 |
| Example 5 | Toner 5 | A | 0 | A | 0.1 | A | 0.01 | A | 1 | A | 1 | A | 0.01 |
| Example 6 | Toner 6 | A | 1 | B | 0.5 | A | 0.01 | A | 4 | B | 4 | A | 0.01 |
| Example 7 | Toner 7 | A | 2 | C | 1.2 | B | 0.04 | A | 6 | B | 4 | A | 0.01 |
| Example 8 | Toner 8 | A | 1 | B | 0.7 | B | 0.04 | A | 4 | B | 4 | A | 0.01 |
| Example 9 | Toner 9 | A | 3 | C | 1.4 | C | 0.07 | A | 7 | B | 4 | A | 0.01 |
| Example 10 | Toner 10 | A | 2 | B | 0.9 | C | 0.07 | A | 7 | B | 4 | A | 0.01 |
| Example 11 | Toner 11 | A | 1 | B | 0.7 | B | 0.04 | A | 5 | B | 4 | A | 0.02 |
| Example 12 | Toner 12 | A | 2 | C | 1.2 | B | 0.04 | A | 6 | B | 4 | A | 0.01 |
| Example 13 | Toner 13 | A | 0 | A | 0.1 | A | 0.01 | A | 2 | A | 1 | A | 0.01 |
| Example 14 | Toner 14 | A | 0 | A | 0.1 | A | 0.01 | A | 2 | A | 1 | A | 0.01 |
| Example 15 | Toner 15 | A | 1 | A | 0.2 | B | 0.04 | A | 4 | B | 4 | A | 0.01 |
| Example 16 | Toner 16 | B | 5 | A | 0.3 | C | 0.07 | A | 5 | B | 4 | A | 0.01 |
| Example 17 | Toner 17 | A | 0 | A | 0.1 | A | 0.01 | A | 2 | A | 1 | A | 0.01 |
| Example 18 | Toner 18 | A | 1 | B | 0.6 | B | 0.04 | A | 5 | B | 4 | A | 0.01 |
| Example 19 | Toner 19 | A | 3 | C | 1.3 | C | 0.07 | A | 7 | B | 4 | A | 0.01 |
| Example 20 | Toner 20 | B | 4 | A | 0.2 | A | 0.01 | A | 4 | B | 4 | A | 0.02 |
| Example 21 | Toner 21 | B | 5 | B | 0.5 | A | 0.01 | A | 5 | B | 4 | A | 0.01 |
| Example 22 | Toner 22 | B | 6 | C | 1.1 | A | 0.01 | A | 6 | B | 4 | A | 0.01 |
| Example 23 | Toner 23 | A | 0 | A | 0.2 | A | 0.01 | B | 10 | A | 2 | A | 0.01 |
| Example 24 | Toner 24 | A | 0 | A | 0.3 | A | 0.01 | C | 15 | A | 2 | A | 0.01 |
| Example 25 | Toner 25 | A | 0 | A | 0.2 | A | 0.01 | B | 10 | C | 7 | A | 0.02 |
| Example 26 | Toner 26 | A | 0 | A | 0.2 | A | 0.01 | C | 15 | C | 7 | A | 0.01 |
| Example 27 | Toner 27 | A | 1 | A | 0.3 | B | 0.04 | B | 10 | A | 2 | A | 0.01 |
| Example 28 | Toner 28 | A | 0 | A | 0.1 | A | 0.01 | A | 3 | A | 2 | B | 0.05 |
| Example 29 | Toner 29 | A | 0 | A | 0.1 | A | 0.01 | A | 4 | A | 2 | B | 0.05 |
| Example 30 | Toner 30 | A | 1 | A | 0.2 | A | 0.01 | A | 4 | A | 2 | B | 0.05 |
| Example 31 | Toner 31 | A | 1 | A | 0.2 | A | 0.01 | A | 3 | A | 2 | B | 0.05 |
| Example 32 | Toner 32 | A | 1 | A | 0.4 | A | 0.01 | A | 7 | A | 2 | C | 0.10 |
| Example 33 | Toner 33 | A | 1 | A | 0.4 | A | 0.01 | A | 8 | A | 2 | C | 0.12 |
| Example 34 | Toner 34 | A | 0 | A | 0.1 | A | 0.01 | A | 1 | A | 2 | A | 0.01 |
| Example 35 | Toner 35 | A | 1 | A | 0.2 | A | 0.01 | A | 1 | B | 4 | A | 0.02 |
| Example 36 | Toner 36 | A | 1 | A | 0.2 | A | 0.01 | A | 2 | B | 4 | A | 0.01 |
| Example 37 | Toner 37 | A | 1 | A | 0.2 | A | 0.01 | A | 1 | B | 4 | A | 0.01 |
| Example 38 | Toner 38 | A | 1 | A | 0.2 | A | 0.01 | A | 2 | B | 4 | A | 0.02 |
| Comparative Example 1 | Toner 39 | D | 13 | B | 0.9 | D | 0.15 | B | 14 | C | 9 | C | 0.14 |
| Comparative Example 2 | Toner 40 | D | 18 | C | 1.4 | D | 0.18 | B | 14 | C | 8 | C | 0.13 |
| Comparative Example 3 | Toner 41 | D | 14 | B | 0.9 | D | 0.19 | B | 13 | C | 9 | C | 0.14 |
| Comparative Example 4 | Toner 42 | D | 16 | B | 0.9 | D | 0.20 | B | 14 | C | 8 | C | 0.13 |
| Comparative Example 5 | Toner 43 | D | 13 | B | 0.9 | D | 0.18 | B | 13 | C | 9 | C | 0.14 |
| Comparative Example 6 | Toner 44 | D | 16 | B | 0.9 | D | 0.15 | B | 14 | C | 8 | C | 0.14 |
| Comparative Example 7 | Toner 45 | D | 15 | B | 0.9 | D | 0.19 | B | 13 | C | 9 | C | 0.13 |
| Comparative Example 8 | Toner 46 | D | 20 | C | 1.4 | B | 0.06 | B | 14 | C | 8 | C | 0.14 |
| Comparative Example 9 | Toner 47 | D | 21 | C | 1.4 | B | 0.06 | B | 13 | C | 9 | C | 0.14 |
| Comparative Example 10 | Toner 48 | D | 16 | B | 0.9 | B | 0.06 | B | 14 | C | 8 | C | 0.13 |
| Comparative Example 11 | Toner 49 | D | 18 | B | 0.9 | B | 0.06 | B | 14 | C | 9 | C | 0.14 |

In the table, Evaluation 1 indicates an evaluation of the cleaning property in a low temperature and low humidity environment, Evaluation 2 indicates a fog evaluation after long-term durable use in a low temperature and low humidity environment, Evaluation 3 indicates the stability of the printing rate of cleaning in a low temperature and low humidity environment, Evaluation 4 indicates the halftone reproducibility in a low temperature and low humidity environment, Evaluation 5 indicates a cleaning property evaluation in an extremely low temperature and low humidity environment, and Evaluation 6 indicates the electrification rising property in a low temperature and low humidity environment.

Comparative Examples 1 to 11

In Comparative Examples 1 to 11, toners 39 to 49 were used as the toner, and the above evaluation was performed. Table 6 shows the evaluation results.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-029588, filed Feb. 28, 2022 which is hereby incorporated by reference herein in its entirety.

What is claimed is:

1. A toner, comprising:

a toner particle comprising a binder resin;

a fatty acid metal salt particle on a surface of the toner particle; and a hydrotalcite particle comprising fluorine and aluminum on a surface of the toner particle, wherein the fluorine and aluminum are present inside the hydrotalcite particle in line analysis of STEM-EDS mapping analysis of the toner, a ratio F/Al of an atomic concentration of fluorine in the hydrotalcite particle to aluminum in the hydrotalcite particle, obtained from main component mapping of the hydrotalcite particle through the STEM-EDS mapping analysis of the toner, is 0.02 to 0.60, and S1/H1 is 0.25 to 9.00 when S1(%) is an area ratio of the fatty acid metal salt particle to the toner particle in an EDS measurement field, measured through the STEM-EDS mapping analysis of the toner, and H1(%) is an area ratio of the hydrotalcite particle to the toner particle in the EDS measurement field, measured through the STEM-EDS mapping analysis of the toner.

2. The toner according to claim 1, wherein

S2/H2 is 0.10 to 18.00

S2=(metal atomic concentration)×S1×100 and

H2=(F atomic concentration)×H1×100 when F atomic concentration is an atomic concentration of fluorine in the hydrotalcite particle, obtained from main component mapping of the hydrotalcite particle through the STEM-EDS mapping analysis of the toner, and metal atomic concentration is an atomic concentration of metal atoms in the fatty acid metal salt particle, obtained from main component mapping of the fatty acid metal salt particle through the STEM-EDS mapping analysis of the toner.

3. The toner according to claim 1, wherein a primary particle of the hydrotalcite particle has a number average particle diameter of 40 to 1100 nm.

4. The toner according to claim 1, wherein S3>H3 when S3 (nm) is a number average particle diameter of primary particle of the fatty acid metal salt particle, and H3 (nm) is a number average particle diameter of primary particle of the hydrotalcite particle.

5. The toner according to claim 1, wherein the toner particle comprises at least one polyvalent metal element selected from the group consisting of aluminum, magnesium, calcium and iron, and an atomic concentration of the polyvalent metal element in the toner particle is 0.01 to 0.09 when an atomic concentration of carbon in the toner particle is 100 in main component mapping of the toner particle through the STEM-EDS mapping analysis of the toner.

6. The toner according to claim 1, wherein F/Al is 0.04 to 0.32.

* * * * *